US 7,577,938 B2

(12) United States Patent
Bent et al.

(10) Patent No.: US 7,577,938 B2
(45) Date of Patent: Aug. 18, 2009

(54) DATA ASSOCIATION

(75) Inventors: Samuel W Bent, Bellevue, WA (US);
David J Jenni, Sammamish, WA (US);
Namita Gupta, Kirkland, WA (US);
Alexander I Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 10/783,842

(22) Filed: Feb. 20, 2004

(65) Prior Publication Data
US 2005/0188349 A1  Aug. 25, 2005

(51) Int. Cl.
G06F 9/44 (2006.01)
G06F 3/00 (2006.01)

(52) U.S. Cl. .................... 717/113; 717/104; 717/106; 715/762

(58) Field of Classification Search .................. None
See application file for complete search history.

(56) References Cited

U.S. PATENT DOCUMENTS

| 5,335,320 | A | 8/1994 | Iwata et al. | |
| 5,706,505 | A * | 1/1998 | Fraley et al. | 707/103 R |
| 6,247,020 | B1 | 6/2001 | Minard | |
| 6,463,442 | B1 | 10/2002 | Bent et al. | |
| 6,540,142 | B1 * | 4/2003 | Alleshouse | 235/462.01 |
| 6,571,253 | B1 | 5/2003 | Thompson et al. | |
| 7,386,835 | B1 | 6/2008 | Desai et al. | |
| 2003/0025728 | A1 * | 2/2003 | Ebbo et al. | 345/744 |
| 2004/0034833 | A1 * | 2/2004 | Kougiouris et al. | 715/513 |
| 2004/0078760 | A1 * | 4/2004 | Melhem et al. | 715/522 |
| 2004/0240403 | A1 | 12/2004 | Kotzin | |
| 2005/0108681 | A1 | 5/2005 | Bent et al. | |

OTHER PUBLICATIONS

Thimbleby; "View binding and user enhanceable systems"; Visual Computer; vol. 10, No. 6; 1994; pp. 337-349.

* cited by examiner

*Primary Examiner*—Michael J Yigdall
(74) *Attorney, Agent, or Firm*—Lee & Hayes, PLLC

(57) ABSTRACT

In an implementation of data association, a data item has a data item property with an associated value and a user interface element has an element property with a value that can be defined by an association to the data item property. A binding definition associates the element property of the user interface element with the data item property such that an application program which generates a user interface for display can be developed independent of the data item, and such that the data item can be developed independent of display-related information corresponding to the user interface element.

33 Claims, 5 Drawing Sheets

312 — Define an additional binding association between an additional user interface element property and an additional data item property of the data item where the additional user interface element has a dependent association to the user interface element, and where the additional binding association defaults to a data context property to identify the data item as the data source of the additional user interface element 314 — Define a collection of data items and develop a representation of the data items for display in a list box of the user interface, where the list box has user interface display elements that are each associated with a referenced data item in the representation of the data items 316 — Define a data style definition for a visual representation of the associated value of the data item property on the user interface 318 — Declare an instance of a data class which corresponds to a type of data as a resource, and define the binding definition to include a reference to the data class in a declaration of the binding definition

Fig. 3B

DATA ASSOCIATION

TECHNICAL FIELD

This invention relates to data association.

BACKGROUND

Application programs are typically developed with a user interface that includes display elements and controls that are logically tied, or combined, with associated application data such that the user interface components and the data can not be differentiated or developed independently of each other. For example, data objects developed for integration with an application program typically include various user interface element and control display information such as pixel position, font size, display position, graphic implementation information, and the like.

Because the application program user interface and the application data are logically linked, changes applied at the user interface necessitate an update of the application data. Similarly, changes in the format of the application data necessitates an update or modification of the application program to properly generate the user interface to display the application data. These data and display format dependencies require extensive programming updates and dedicated application data access methods, and are difficult to maintain. Further, data and display format dependencies limit the expandability and/or adaptability to incorporate different data types and formats without significant binding logic changes. Further, these existing data binding techniques for data and display format dependencies do not facilitate a way in which to bind application data to non-visual objects.

SUMMARY

Data association is described herein.

In an implementation, a data item has a data item property with an associated value and a user interface element has an element property with a value that can be defined by an association to the data item property. A binding definition associates the element property of the user interface element with the data item property such that an application program which generates a user interface for display can be developed independent of the data item, and such that the data item can be developed independent of display-related information corresponding to the user interface element.

In another implementation, an application program can generate a user interface having a display element to display a representation of a data item. A data programming model can associate a display element property of the display element with a data item property of the data item with a binding definition such that a value of the data item property is displayed as the representation of the data item.

BRIEF DESCRIPTION OF THE DRAWINGS

The same numbers are used throughout the drawings to reference like features and components.

FIGS. 3A and 3B illustrate a flow diagram of an exemplary method for an embodiment of data association.

DETAILED DESCRIPTION

Data association is described as a data programming model in which a database of data items can be developed independently of display-related information to display data item values on a user interface. Further, an application program that generates the user interface can also be developed independent of the data items to maintain a distinction between the data and the presentation of the data. The data programming model includes a binding definition to associate a user interface element property with a data item property such that a value of the element property is defined by the association to the data item property.

Accordingly, the data programming model facilitates an association, or connection, between data items and a user interface representation of the data items with binding definitions. This data association model provides that data can be described separately from a user interface and provides that an application developer can integrate any form of data and domain-specific logic with an application-specific user interface. For a designer and/or an application developer, the data programming model provides greater productivity, flexibility, and a user-friendly programming update and maintenance system.

The following discussion is directed to systems and methods for data association. While features of the described systems and methods can be implemented in any number of different computing environments, they are described in the context of the following exemplary implementations.

Figure 1:
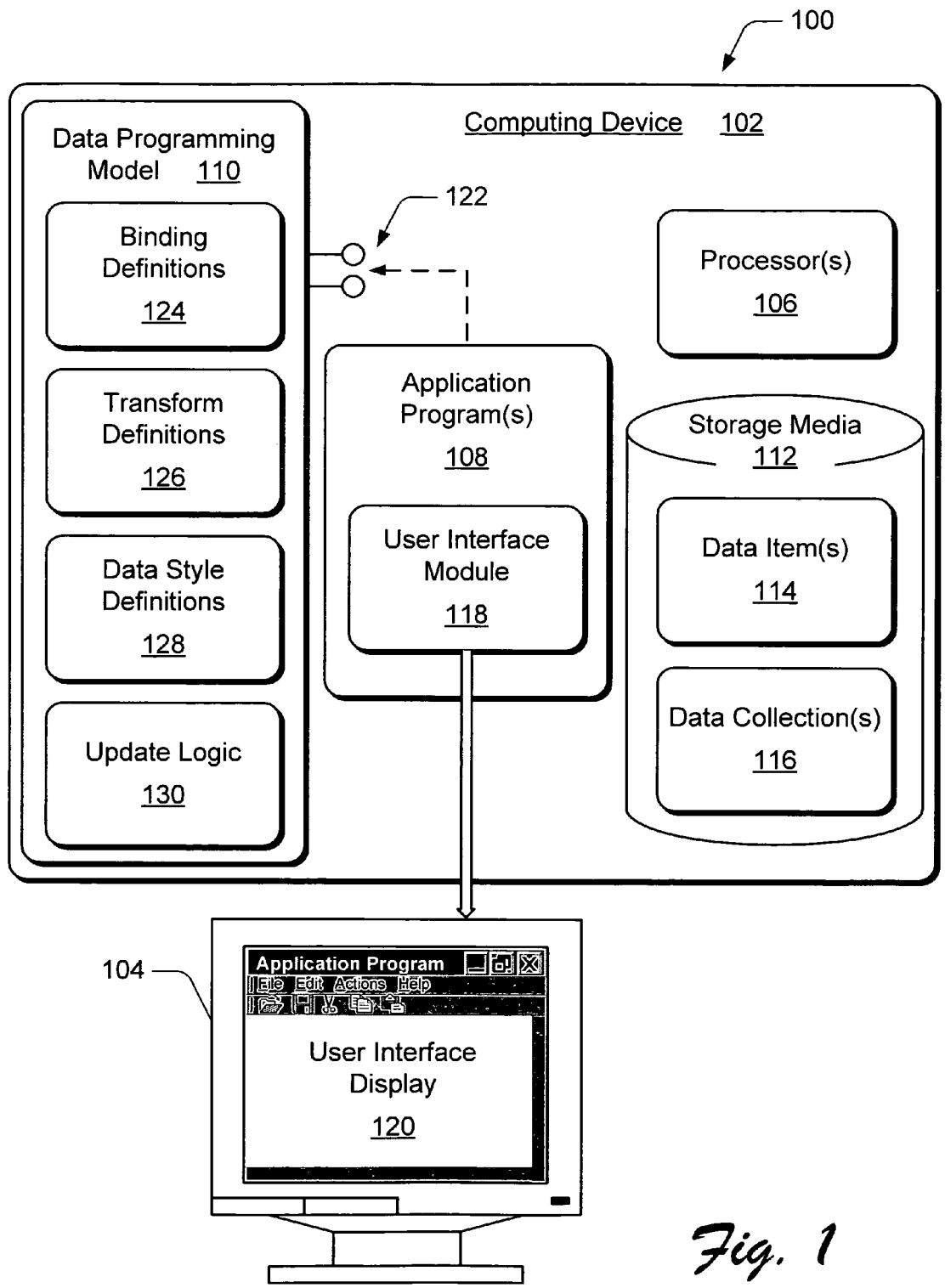
FIG. 1 illustrates various components of a computing system in which an exemplary embodiment of data association can be implemented.

FIG. 1 illustrates various components of a computing system 100 in which an exemplary embodiment of data association can be implemented. The computing system 100 includes a computing device 102 and a display device 104. The computing device 102 includes one or more processors 106 (e.g., any of microprocessors, controllers, and the like) which process computer executable instructions to implement features of data association. The processors 106 also execute one or more application programs 108 and a data programming model 110 which can also be implemented as an application program of computing system 100.

The computing system 100 can be implemented with one or more memory components, such as any form of storage media 112 (e.g., any of RAM, ROM, and the like), which maintains data items 114 and data collections 116. The computing system 100 may be implemented with any number and combination of differing components as further described below with reference to the exemplary computing systems, devices, and components shown in FIG. 4.

In this example, an application program 108 includes a user interface module 118 (e.g., a component of an application program 108) that generates an application specific user interface 120 for display on the display device 104. The application programs 108 communicate with the data programming model 110 via various application programming interfaces (APIs) 122 which are described below in a Data Association Binding section. The data programming model 110 includes binding definitions 124, transform definitions 126, data style definitions 128, and update logic 130. Although not illustrated, the application programs 108, the data programming model 110, along with the binding, transform, and data style definitions, can be maintained with storage media 112 in computing device 102.

A data item 114 can be maintained with storage media 112 as any type of data, such as data objects, and can further be maintained as any form of data, such as XML (extensible markup language) data (or any other tag-based data), SQL data, and/or as any other database specific data. Any type of data item 114 includes one or more data item properties that can each have an associated value. A data item 114 can be implemented as a specific object, as the referenced current item of a data collection 116, as a user interface element, or as an object obtained from a data context property of a user interface element.

A data item property can be described by name, by an expression such as "A.B[2]#X/C.D", or by an XPath expression (when the data item is maintained as an XML document). The expression can be parsed similarly to a C# (pronounced C-Sharp) expression where a dot (.) is interpreted as a "subproperty", brackets [ ] are an "indexer", the pound sign (#) identifies a named view, and a slash identifies a current item in a view. Additionally, any run-time object can be the data item, or source item, for a binding and any public properties of the run-time object can be defined as a data item property.

A binding definition 124 is implemented to associate an element property of a user interface element (e.g., of the user interface 120) with a property of a data item 114 such that a value of the user interface element property is defined by the association to the data item property. This provides that a database of data items 114 can be developed independently of display-related information to display the data items on a user interface 120. Further, an application program 108 can also be developed independent of the data items 114 to maintain a distinction between the data and the presentation of the data. Accordingly, the data programming model 110 facilitates an association, or connection, between data items and a user interface representation of the data items with binding definitions 124. A binding definition 124 can be implemented to bind any property of a user interface element or control to any property of any data item 114.

A user interface property receives a value based on the associated value of a data item property. When a binding is established with a binding definition 124, changes in the data item property can be updated to the corresponding user interface property. In an embodiment, a developer can optionally implement the reverse change update such that changes in the user interface property are propagated to the data item property. These two examples of binding are referred to as a one-way binding definition and as a two-way binding definition. Optionally, a one-time binding initializes a user interface property from a data item property, but does not update when changes are made to the data item property thereafter.

A transform definition 126 generates a transformed value of a data item property for association with a user interface element property. The transform definition 126 generates the transformed value from a current value of the data item property such that the current value remains unchanged in storage media 112. In an embodiment, a transform definition 126 is developed as a logic component of an application program 108 to transform a value of a data item property when associated with a user interface element property by a binding definition 124. A transform definition 126 is interjected in a data path between a data item 114 and the user interface 120 and transforms the data item without a change in the data model (e.g., the data items 114 maintained with storage media 112).

A binding definition 124 can be associated with a transform definition 126 (e.g., a transformer) having a function to change a data item property value into a new form, type, or value whenever the data item property value is transferred or referenced from the data item 114 to the user interface property. Further, the transform definition function can be defined to implement a reverse change of the data item property value when the value is propagated from the user interface element to the data item property. A transform definition 126 can also generate a transformed value of a data item property for compatible association with a user interface element property.

A transform definition 126 can be implemented as an object that exposes a data transformer interface which can define a simple type conversion, or can be developed to include more complicated logic defined by a developer of the application program 108. The data programming model 110 may also include default transform definitions 126 if an application program developer does not specify or develop a specific transform definition. For example, a system-defined type converter can be automatically applied as a transformer when needed which simplifies the declaration of bindings between many mismatching types, such as binding a user interface property of type Bool (e.g., Boolean) to a data item property of a type String (whose values are presumably the strings "true" and "false" for a Boolean type). Application-defined transform definitions can be defined and attached to any binding that associates user interface element properties and data item properties.

The update logic 130 can be implemented as any form of hardware, firmware, software, or any combination thereof that may be implemented to perform the logical operations associated with data association. Such, logic can also include any supporting circuitry that may be required to complete a given task including supportive non-logical operations. For example, "logic" may also include analog circuitry, memory, input/output (I/O) circuitry, interface circuitry, power providing/regulating circuitry, etc. Update logic 130 can be implemented to receive an update notice of a data item 114, such as an update of a value of a data item property, and initiate that a binding definition 124 update the user interface element property on the user interface 120 with the value change of the data item property. Further, the update logic can be implemented to receive a user interface element update, such as a change of a value of a user interface element property, and update an associated data item property with the value change of the user interface element property.

A data collection 116 is a collection of data items 114 and any number of data collections 116 can each include any configuration and/or combination of the data items 114. The data programming model 110 provides that a developer can create multiple representations of the data items over a single underlying data collection. A representation of data items 114 is also referred to herein as a "view", where a user interface display element is bound (e.g., with a binding definition 124) over a collection. In an embodiment, a collection view can be defined as a class, and the view references back to the data items in the collection. Although not shown, a view manager can be implemented to manage various view associations to respective data collections 116. A program developer can develop the data collections 116, and further, define filters to generate the one or more views (e.g., representations) that may be associated with a particular data collection 116. This provides an extensible mechanism by which various configurations of the data items 114 can developed for display independent of the data items themselves.

The data programming model 110 can recognize data collections 116 as objects that expose collection interfaces IEnumerable, ICollection, IList, and/or IBindingList. Additionally, the data programming model can recognize interfaces such as ICollectionViewFactory for creating views, ICollectionChange for notification of changes to a data collection 116 (e.g., an insertion or deletion of data items), ICurrentItem for maintaining a view as current, and IContains for filtering a view. A view is also referred to herein as a representation of the data items 114 in a data collection 116.

A view (e.g., data item representation) initially contains the data items of a data collection 116, but can then be sorted and filtered independently of the data collection and of other views over the same data collection. Each view over a particular data collection can be identified with a name (i.e. a string) to distinguish it from all other views. By exposing an ICurrentItem interface, a view can support a current data item and provide methods such as MoveNext, MoveTo, etc. by which an application program 108 can change the currency. This can be implemented in conjunction with binding definitions that bind to a property of a current data item of a view, either automatically or explicitly.

The data programming model 110 can be implemented to create views over many different collections, including IList and IBindingList. In addition, the data programming model 110 can be implemented to add data collections 116 that expose an ICollectionChange interface which provides that data items can be added or inserted dynamically into an original data collection. An ArrayListDataCollection and associate view ArrayListCollectionView are implemented based on the system collection type ArrayList.

Data styling is implemented with the data style definitions 128 each of which provides a template for a visual representation of the data items 114, or of a collection of data items 116. A developer of an application program 108 also develops the data style definitions 128. Further, data styling is implemented to represent data items as a subtree of user interface elements and associated properties. Data styling utilizes objects of a type style to describe the appearance of a data item and may be described as providing a template through which to view the data items. A template (i.e. the visual tree of a data style definition 128) describes a general form of the visual representation of the data items and provides that part of the representation be obtained as a data item property value corresponding to a particular data item.

The data programming model 110 provides that a data style definition 128 for a particular data item can be associated explicitly by setting a ContentStyle, ItemStyle, or HeaderStyle property, implicitly based on the type of the data item, or extensibly by providing a style selector. The data programming model also includes default data style definitions to provide a data style for data items that are represented frequently. For example, when a data item is a string, the default data style definition 128 displays the string in a text control.

Application programs 108 can be implemented to utilize both control styling to describe the appearance of user interface element controls, and data styling to describe the visual representation of data items within the user interface controls. A developer can describe where data items, or the visual representation of the data items, belong in a user interface control's style, but is not forced to choose how to display the data items. The data programming model 10 provides a ContentPresenter control which is implemented to identify the location of the data items within a user interface control data style definition, and to determine an appropriate visual representation for the data items.

A data style definition 126 is determined for a ContentPresenter based on the data item(s) that it contains (i.e. on the value of its content property). For example, if a control has a value for its ContentStyle property, the value is utilized as the data style definition. Otherwise, if the control has a value for its ContentStyleSelector property, a SelectStyle method of that style selector property is called and the returned data style definition is utilized. Otherwise, a list of resources is searched to determine first, the resources of the control and its ancestors, then the application-wide resources, then the theme-based resources, and finally the system-wide resources. A resource is selected having a named type of the data item, or some base type thereof, and having a value that is a data style definition. If a resource is not located, a default data style definition 128 can be implemented. The resulting data style definition 128 is applied to the ContentPresenter control after initializing the control's DataContext property to the data item obtained from the content property. For a data style definition that contains properties which are data-bound to properties of the DataContext, the properties are associated with the data item property values.

User interface controls can be designed to manage a user-supplied content. A user interface button, list item, and scroll viewer are examples of user interface content controls that support control styling to manage appearance such as shading, borders, and sub-controls (e.g. a page-down button in a scroll viewer). The user interface content controls also support data styling, to present a flexible visual representation of the content. A developer of such a user interface control merely needs to include a ContentPresenter in the control style, and associate or link the ContentPresenter's content, ContentStyle, and ContentStyleSelector properties to the corresponding properties on the control itself. A base class ContentControl is a class from which the user interface controls are derived, and it defines the common properties and implements the common functionality of the user interface controls.

Data association supports additional controls that may be designed and implemented to manage a list of items, such as a ListBox, a Menu, and a RadioButtonList which are all examples of Items Controls. These controls also support control styling to manage their basic appearance, and support data styling to present a flexible visual representation of their data content which, in this example, is a list of data items each represented by a visual subtree. The control style for an items control contains an element to manage the layout of the subtrees corresponding to the data items, and the resulting visual tree will contain a layout panel whose children will ultimately be the subtrees produced from the data items.

The data programming model 110 also defines an ItemUIGenerator class to generate the subtrees from the data items, under control of a layout panel. Every items control has an associated generator and, when the layout panel needs its children, it calls the generator repeatedly to generate the children one item at a time until the layout panel determines a stop of the recursive procedure. The layout panel can generate children for all the data items associated by the items control, or only for some of them as virtualization.

An items control generator creates a subtree from a data item by creating a wrapper element of a particular type which is selected by the items control, and by applying a control style to that wrapper. For example, the ListBox control chooses ListBoxItem as the type for its wrappers, so each subtree under the layout panel will have a ListBoxItem at its root. The generator sets the DataContext on the wrapper to be the corresponding item which enables properties within each subtree to depend on the data via data-binding. The generator also propagates style information from the items control for each wrapper and propagates the values of the ItemStyle and ItemStyleSelector properties to appropriate properties of the wrapper, depending on the type of the wrapper. For example, if the wrapper is a ContentControl, the values are propagated to the ContentStyle and ContentStyleSelector properties.

Data style rules complete the process. For example, after adding a ListBoxItem to a tree, the control style for ListBoxItem is applied to produce borders and sub-controls, one of which is a ContentPresenter. A data style definition 128 is selected and applied to the ContentPresenter to produce the visual representation of the corresponding data item, and this data style contains data-bound properties that display values from the data item.

Data-binding and data styling can be implemented with arbitrary data supplied by an application program 108 at runtime. The data programming model 110 also provides convenient classes that manage particular kinds of data. These classes enable a developer to introduce data into the application program declaratively, typically by declaring an instance of the class as a resource, and referring to that resource in the declaration of a binding definition. The classes expose an IDataSource interface, which provides a uniform interface to retrieve data and receive notification of changes.

An ObjectDataSource class creates an instance of an arbitrary type, as described by a developer via a TypeName property. Optionally, the type may be defined by an application program 108 to provide domain-specific data. An XmlDataSource class retrieves data from an XML document. The document can be described inline in markup (i.e. within the scope of the XmlDataSource tag), downloaded from a URL referenced in the source property, or provided dynamically at runtime by setting a document property. A SqlDataSource class retrieves data items from a SQL database and has properties which provide that the developer can supply the connection and query information to name the intended server database and fetch the desired data items. A WinFSDataSource class retrieves data items from a local WinFS database and has properties which allow the developer to supply the query information to describe the tables and data desired. In addition to these data sources, the data programming model 110 can also utilize source objects that already exist in the application program 108. These include user interface elements and arbitrary objects created by the application program 108.

Figure 2:
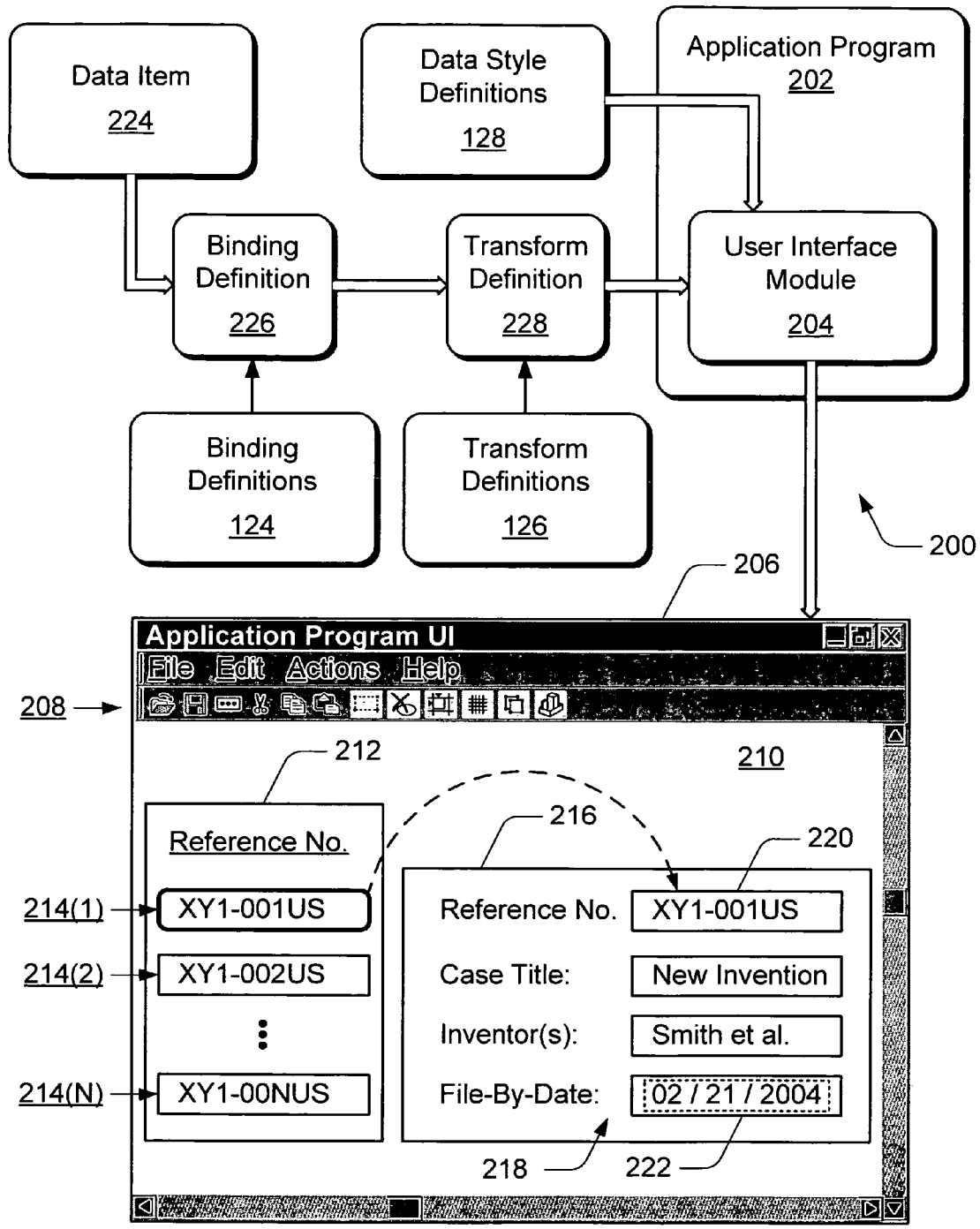
FIG. 2 illustrates an embodiment of data association and various components of the computing system shown in FIG. 1.

FIG. 2 illustrates an exemplary embodiment 200 of data association and various components of the computing system 100 shown in FIG. 1. In this example 200, an application program 202 includes a user interface module 204 that generates a user interface display 206. The user interface 206 includes various application specific user-selectable controls 208 and a display region 210. A first list box 212 is displayed within the display region 210 and, in this example, includes a list of client reference numbers that are displayed in user interface display elements 214(1-N).

A second list box 216 is also displayed within the display region 210 and includes information 218 related to a particular client reference number. For example, the client reference number shown in user interface display element 214(1) corresponds to the client reference number shown in a user interface display element 220 in the second list box 216. A user interface display element 222 is shown to indicate that the data (e.g., a date of Feb. 21, 2004) is emphasized to communicate an importance to a user viewing the user interface 206. Although the data displayed in user interface display element 222 is shown to have a dashed border in this example, any number of different techniques can be implemented to emphasize the data, such as underline, bold, a change in text color, and the like.

In this example, the user interface display element 222 has an element property with an associated value (e.g., the date of Feb. 21, 2004) that is defined by an association to a data item property of a data item 224. A binding definition 226 associates the element property of a user interface display element 222 with the data item property of data item 224 such that the value of the user interface element property is defined by the association to the data item property. A transform definition 228 is implemented to change the representation of the data item value displayed in the user interface display element 222. For example, the date displayed in the user interface display element 222 is displayed with emphasis to indicate that in less than one month, the referenced client application needs to be filed. A developer can define a user interface display element and associate any number of different properties with data association as described herein which provides an unlimited and extensible innovation. The presentation of the data item 224 is dependent upon the transform definition 228 while the presentation characteristics are not integrated, or tied, to the data items.

Each of the user interface display elements (e.g., display elements 220, 222, and the like) displayed in the list box 216 have a data context property that defines the data item 224 as the data source of the user interface elements. An additional binding definition 124 can be implemented to associate the element properties of the user interface display elements with additional data item properties of the data item 224. The user interface display elements displayed in list box 216 have a dependent association to the user interface display element 220 such that the additional binding definition 124 defaults to the data context property of the user interface display element 220 to define the data item 224 as the data source of the additional user interface elements.

The data programming model 110 defines a data context property on all of the user interface display elements and the property value is the default object to be used as the source data item for all binding definitions 124 attached to a user interface display element. The data context property is an inherited property such that when a user interface element does not define a value for data context, it uses the same property value as its parent. This provides a developer with a convenient way to define the source data item for an entire subtree of user interface elements.

User interface elements and controls may have properties which can be edited by a user via user interface 206. For example, the text of a text box, the check state of a check box, and the value of a slider are all properties that a user can change by typing, clicking, moving a mouse, or by some other user-selectable input. A data item receiving a propagated value change may be implemented to validate a new value. In addition, a developer can supply additional validation logic that is performed before a value change is propagated to the data item. Validation logic can be utilized to verify that a numeric value lies in the proper range, or that a string value (e.g., such as a driver's license number) has the correct format. The data programming model can also be implemented to trap validation errors when they occur and provide visual feedback to a user of the user interface 206.

When an items control contains a large number of data items (i.e., more than can be displayed at one time on a user interface display), virtualization can be implemented to generate user interface display elements for only those data items that actually appear in the display As a user scrolls through the list of data items, the items control, together with the associated generator, automatically generates the user interface elements to represent the data items that are currently visible, and discards the user interface elements for the data items that are no longer visible. This process may also be referred to as user interface virtualization because it pertains to keeping only a small number of virtual user interface subtrees. A second level of virtualization, referred to as item virtualization, pertains to a similar technique applied to the data items themselves. Rather than maintaining a full list of data items in memory, a virtualizing collection keeps only those data items for the user interface layout and the application program itself. The remaining data items are stored externally, in a disk file or a local database or even a remote database, and are only retrieved when needed.

A shared set of style information can be associated with two or more objects or data items that are to be displayed as part of a list or some other visual grouping of the items on a user interface. By sharing the style information of a data style definition (e.g., the visual representation characteristics information), a program developer need only define the data style information or style once. Upon defining the data style definition, the developer can declaratively associate all of the data items in the list or group with the defined style.

Within the display region 210 of user interface 206 shown in FIG. 2, the client reference numbers are displayed in the list region 212 and information 218 related to a particular client is displayed in the list region 216. In an embodiment, each set of client information may be a distinct object stored in a database (e.g., storage media 112) or other data store. As an object of a class "Client", each has a set of properties that may include a title property, a name property, and a file-by-date property. The exemplary list region 212 includes any number of client objects 214(1-N) that display a reference number property associated with each client object. A developer can utilize a list control, such as ListBox, to create the list regions 212 and 216. Controls such as ListBox and other menu controls are implemented to manage a collection of items of arbitrary type.

The list region 216 displays additional object properties for a highlighted object, such as the first client reference number shown at 214(1). When the object 214(1) is highlighted or selected by a user in the list region 212, the list region 216 displays the information properties 218 associated with the client object data at 214(1). The client object is associated with the user interface display element 220 to display the reference number. The objects for the clients and the associated information, along with data style definitions 128, may be provided to a rendering engine of computing system 100 to display the list of items in a designed display format.

In an embodiment, the functional components to implement data association reside and operate on a single computing system, such as computing system 100 shown in FIG. 1. Alternatively, one or more of the functional components may be implemented in separate computing systems in a distributed network, an example of which is described with reference to FIG. 4.

An application program 202 developed for implementation with the data programming model 110 and in an exemplary embodiment of data association may represent any number of different computer applications or programs developed for use on many different types of computer systems. The application program 202 in conjunction with the user interface module 204 executes in a computing system to display user interface 206 and the list regions 212 and 216. In an embodiment, the application program 202 accesses storage media 112 which stores the objects as data items 114. The data item objects (e.g., data items 114) relate to user interface display elements and controls that are displayed in a list region or other grouping, yet are independent of the user interface elements and control (i.e., how an object will ultimately be rendered for display).

In an embodiment, the data item objects 114 may be managed as a set of similar objects in an object collection where each of the objects have similar properties or fields. The content of the similar properties or fields is different for each different client object. In other embodiments, there may be other types of objects as part of another object collection maintained within the same data store (e.g., storage media 112).

The application program 202 also accesses or is associated with the data style definitions 128 which may be developed or designed by the developer of the application program 202, or the data style definitions 128 may be created by a third party. The style definitions relate to the actual style properties to be associated with the data content of the data item objects 114 when the data is ultimately displayed. A data style definition 128 is stored separately from the data item objects 114 and is independent of the data itself.

A data style definition 128 influences the display of data in two principal ways: (1) by specifying property values for the item itself, and (2) by specifying an internal representation for the item, e.g., a visual subtree. For instance, a data style definition 128 may include font size (such as 12 or 10 point, etc.), type (such as Arial or Courier, etc.), color (such as black or red, etc.), attributes (such as bold or italics, etc.), location (such as position on the display), etc. Also, a data style definition may describe a visual subtree to aid in the creation of an internal visual representation of the data items, such as for a given data object having fields to be displayed. Moreover, the data style definitions 128 may be sub-divided into separate style definitions for each of the properties of each data object to be displayed. In a particular embodiment, a data style definition 128 may be stored for each class of data objects 114.

The data style definitions 128 may also contain list control style information which provides visual style information for the list control itself, independent of the data to be displayed in the list control. That is, there may be a significant amount of user interface information regarding the building of a list on a display including size information, border information, shading and color information, how the user interacts with the list, such as mouse interaction, etc. A list control style is used to provide such information.

In an embodiment, the application program 202 includes data binding definitions 124 that, during operation, cause data items 114 (e.g., properties of the data item objects) to be bound to the user interface elements or properties of a data style definition. The data binding definitions 124 can be implemented as declarative program statement(s) that associate one or more data objects to a data style. Such an association may be made by explicitly identifying the data types and the data style for that type, by providing a style selector call, by providing a default style, or by some other method.

Application program 202 operates on a platform that relates to the framework or application programming interface (API) which provides the necessary communication between the application program 202 and the operating system of the computing device, such as computing device 102 shown in FIG. 1. As such, the platform provides the intermediate functions and services to allow the application program 202 to ultimately display the user interface 206 on a display 104. Although not shown, the operating system and its necessary operations occur between the platform and display.

The platform can include a tree assembler module that parses the information received from the application program 202 to build a visual tree which is an internal representation of the display, and thus represents the combination of the data from the data item objects 114 to be displayed and the information from the data style definitions 128 that describe how to display the data. In an embodiment, the tree assembler module includes a style lookup module and a data bind module which are used to locate the style elements and to bind a property of a user interface element to a data property (i.e., establish the desired links). The application program 202 can request that the style lookup module lookup the correct style definition and request that the data bind module make the links. These requests may be declarative and interpreted by the tree assembler module, or procedural such that the application program 202 calls the binding methods at runtime. Moreover, a data style may also have a declarative request for binding to data as well in which case the data bind module handles the request.

In an embodiment, the tree assembler receives the data content and the style information directly from the application program 202. In other embodiments, the tree assembler may access the required content and style information directly from the data store (e.g., storage media 112) and the definition module, respectively, through the operation of the data bind module. In doing so, the tree assembler understands where to look and what to find based on the binding information received from the application's data bind section.

The tree assembler module completes the visual tree and passes the tree to the rendering engine which utilizes the visual tree to render the display on the user interface display 206. In an alternative embodiment, the visual tree is passed first to a layout engine that adds more information to the visual tree using user interface elements from a user interface element factory to complete the tree. The layout engine understands the physical properties of the display such that it can determine where to place certain display items and how large to make them relative to the physical characteristics of a particular computing system.

The application program 202 and the tree assembler module operate in a dynamic environment wherein the tree assembler may make an initial visual tree and as the application program 202 executes, items and displays may change, such that the tree assembler may rewrite or modify the visual tree to ultimately update the display.

A listing of exemplary markup language (e.g., XAML code) is provided to illustrate defining a data style definition 128 for use by the tree assembler. As may be appreciated, the provided code is only one example of a way in which the concepts described herein may be implemented and should not be considered limiting to the shown syntax.

```
<Style def:Name="ClientStyle">
    <Style.VisualTree>
        <DockPanel>
            <Text TextContent="*Bind(Path=Number)"/>
            <Text TextContent="*Bind(Path=Title)"
                FontStyle="Italic" />
            <Text TextContent="*Bind(Path=Name)"/>
            <Text TextContent="*Bind(Path=File-by-Date)"/>
        </DockPanel>
    </Style.VisualTree>
</Style>
<ListBox ItemStyle="{ClientStyle}" ItemsSource=
"*Bind(DataSource={Clients})"
</ListBox>
```

The first line <Style def:Name="ClientStyle"> represents the declaration or definition of a new style named "ClientStyle". The name is merely an example that continues from the client example shown in the list item regions 212 and 216 on user interface display 206. Following the definition of the style name, the markup describes the visual tree in the next eight lines. The visual tree consists of a dock panel that contains four text controls identified as "TextContent=". The visual tree essentially states that when a client is displayed, four properties of a client object are to be shown as text (via the Text controls), using layout rules supplied by the surrounding DockPanel.

The first text control binds the data from the number field of the client object to be displayed first. As may be appreciated other details may be required to make this example work, such as adding width dimensions for the columns to each text control, etc. The second text control binds the data from the title field of the client object to be displayed second, the third text control binds the data from the name field of the client object to be displayed third, and the fourth text control binds the data from the date field of the client object to be displayed fourth. The style may be applied to all client objects at runtime such that the style does not have to be associated with the data until runtime. Further, this one style definition can be applied to all client objects such that the style does not have to be repeated when the client objects are created.

The exemplary code listing also illustrates a sample request to list clients. The "<ListBox" command represents a "ListBox" control syntax for XAML. The ListBox declaration contains an explicit "ItemStyle" reference which, in this case, is set to "ClientStyle" to call, or reference, the data style definition described above. Further this ListBox example also designates the source of the items as "ItemsSource="*Bind (DataSource={Clients})"." Binding the item source in this manner indicates that the ListBox command is to list data from all the client objects using the client style definition. From this, the tree assembler builds a visual tree to list the numbers, titles, names, and dates of all the client objects in the client collection.

An exemplary visual tree is provided which is a tree-like structure having nodes for the visual representation of the elements to be displayed. Not all elements are shown in a visual tree as not all elements have visual information, and this is only a portion of a potentially larger visual tree.

```
ListBox
    ...(elements from the style for ListBox)...
    DockPanel
        ListItem
            ...(elements from the style for ListItem)...
            ContentPresenter
                Dock Panel
                    Text = Number1
                    Text = Title1
                    Text = Name1
                    Text = Date1
        ListItem
            ...(elements from the style for ListItem)...
            ContentPresenter
                Dock Panel
                    Text = Number2
                    Text = Title2
                    Text = Name2
                    Text = Date2
        ListItem
            ...(elements from the style for ListItem)...
            ContentPresenter
                Dock Panel
                    Text = NumberN
                    Text = TitleN
                    Text = NameN
                    Text = DateN
```

The first item in the visual tree is the list box item which the tree assembler enters into the visual tree when encountering a list box command. Next, an inquiry is performed to determine the data style information for the list box itself. The data style information may include properties of the ListBox as well as a visual tree that may contain borders or shading information, controls for scrolling, and the like. In an embodiment, the visual tree contains one element (usually a Panel of some sort) with a property such as "IsItemsHos=true" that indicates where the user interface for the data items belongs. The tree assembler sets the properties of the ListBox to their desired values, creates a copy of the desired visual tree, and adds it to the main visual tree.

The tree assembler creates the user interface for the data items, one at a time, and adds the data item properties to the visual tree under the panel. This user interface is derived from the list control itself, and the ListBox indicates that it expects the first piece of the user interface to be a ListItem. Other list controls may indicate a different type of element, such as a Menu might indicate that it expects a MenuItem. In an embodiment, the manner in which the ListBox indicates that it expects a ListItem involves the use of an "ItemsControl" object which has a property called "ItemUIType." A derived class like ListBox sets this property to typeof(ListItem). The tree assembler module queries this property and creates an element of the desired type. The tree assembler creates an element of this type (a ListItem in the present example), performs an inquiry for its style information, and creates the corresponding visual tree. This style information might describe how the user interacts with the list item, such as what happens when the mouse cursor hovers over a list item, etc.

The visual tree typically contains a special element that indicates where the user interface for the data item belongs. In one embodiment, this special element is a ContentPresenter which is where the second piece of user interface is added. The tree assembler performs an inquiry to determine the style information for the data item, creates a copy of the visual tree described in that style, and adds it to the main visual tree. Thus the content presenter functions to "style" the data content.

The content presenter acts to retrieve the first object and upon receiving the object, such as a client object in this example, the tree assembler uses the defined item's style to layout the proper fields in the visual tree. For instance, the first element in the ClientStyle is a Dock Panel command, such that a dock panel entry is made in the visual tree. Next, with the dock panel, the ClientStyle displays the first text element which is the number from the first client object. The actual text (e.g., the reference number) is not placed here, however. Rather, a binding is defined to account for later changes made to the actual data (i.e., when the data changes in the data item, the data associated with the visual tree will also change). The additional text entries for the client title, name, and date are also inserted into the visual tree.

This process is repeated for all of the client objects which are entered into the visual tree as sub-trees. The completed visual tree may be passed to a layout engine for additional user interface elements prior to being sent to the rendering engine. In another embodiment, the layout engine calls the tree assembler as needed to generate the tree just in advance of the layout process. In essence, the layout engine and the tree assembler module are separate but cooperating modules. The rendering engine accepts the visual tree and uses the same to display the list of clients on the display.

In a method for an embodiment of data association, a request is received to display data from a set of objects. Optionally, the set of objects may be related in that each object is of the same type or of the same class. Upon receiving the request to display data from the data objects, a parse operation parses the request to identify that a list is to be displayed and to determine whether a data style definition should be applied to the list. Further, the parse operation iterates over the list of items and determines if any particular styles should be applied to the data items themselves. In an embodiment, the request to display the data also includes style information which initiates requests, at runtime, to the platform to establish links between the data and the associated styles. In establishing the appropriate links, a search operation may be performed to search for and locate the appropriate style.

Upon establishing the appropriate links, defined styles are applied for the data objects. Although the style is described independently of the data, an apply operation determines the user interface elements to apply from the style such that a visual tree data structure may be built or modified. The modified visual tree may include binding information which initiates requests, at runtime, to the platform to establish links between the properties of the user interface elements and the properties of the data items. These requests may be declarative in that they are interpreted by the platform, or procedural in that the application program 202 calls the binding methods at runtime.

In applying the defined style, visual information is entered into a visual tree. Each data object is associated with style information that is defined independently from the data itself, and stores the information into a data structure, such as the visual tree. The visual tree has visual information for all of the data items (and other user interface elements) to be displayed. The application program 202 requests that the data bind module make these links, and these requests may be declarative in that they are interpreted by the tree assembler module, or procedural in that the application program 202 calls the binding methods at runtime. Moreover, the data styles may also have a declarative request for binding to data as well in which case the data bind module handles these requests. The visual tree is passed to the layout engine and to the rendering engine to optionally apply more style information and to render the display items on the display device.

In another method for an embodiment of data association, list item styling is applied when a list item is to be displayed since the object is a list item. The list-item style relates to an independently defined set of user interface elements that apply to list-items in general, and independently from the actual data to be presented, or displayed in the list. For example, the list-item style may define the background color for the list item or define how the user may interact with the list item.

The content presenter is invoked which provides an indication that a data item is to be displayed. In an embodiment and, as the list item display process is progressing, a content presenter command is received that identifies the actual data object having the data for display. The data style associated with first list item is obtained and the content presenter is invoked which identifies the object collection and the object to be retrieved, along with information regarding the appropriate or relevant visual style. Once the appropriate style is selected, the appropriate style is applied to the content presenter which inserts the visual information into the visual tree. The visual information typically includes user interface properties that are data-bound to data properties of the data object.

A determination is made as to whether all of the data objects have been entered into the visual tree. If there are more objects to add to the visual tree, then the process of applying a list item style to the visual tree is repeated for each object until all of the objects have been evaluated and their visual representations have been entered into the visual tree. In an alternative embodiment, other items may be taken into account before causing the repetition, such as determining to stop adding visual elements to the visual tree when enough user interface elements have been created to fill the available space. Alternatively, it may be determined that a time threshold limit has been exceeded such that no more objects should be added to the visual tree.

There are several methods to determine which style to apply to the data content, such as a style being provided to the list box request as described above where the ItemStyle is specifically provided as the "ClientStyle" such that the content presenter searches for and uses a defined style named ClientStyle. This is an example of an explicit reference by the name of a style. In another embodiment, the list box request may not provide the item style information, but rather provides only the item source information. In this case, the tree assembler recognizes the type of the object to apply to a style. Using this type information, the tree assembler is able to search for any styles that are defined based on the type of the object. In an embodiment, a collection of objects may have many different types of objects, such as client type objects, customer type objects, and others. To display a list of these objects, the list box request may simply refer to the types that are to be displayed and the tree assembler identifies the proper style to apply based on this type information.

In yet another embodiment, the style information is identified using an "ItemStyleSelector" object in the list box request. For example, <StyleSelector def:Name="(anyStyleSelector)" where "StyleSelector" is a class of objects having one method, SelectStyle. The application developer may cause a style selector object to be instantiated when a list box function is called to allow the developer a means of selecting the appropriate style for the appropriate objects. This "StyleSelector" class is particularly useful when an application developer wants to apply different styles to objects of the same type, but having different properties.

In an order of priority, the tree assembler looks for an explicit reference first, then determines whether a style selector has been identified when no explicit style reference is indicated. Next, if neither an explicit style reference nor a style selector has been identified, the tree assembler identifies the type of object and searches for a style based on the object type. Lastly, if no object type style is defined, then a default style may be applied and/or an error message may be displayed to the user.

The operations described above depend on many different things, such as the collection of items, the values of the properties within the collection of items, the style information, the style selector information, the styles defined for the controls (e.g. the list box control and the list item control), etc. Each of the various elements that make up the display components may, in fact, change dynamically. The platform responds to such changes by re-applying the methods as necessary to produce a desired result. For example, during execution of the application program 202, a new data object may be added to the object collection by use of an add item control on the user interface. In response, the tree assembler module is notified of the change where the notification may be an active notification calling to the tree assembler module, or alternatively, the notification may result from the tree assembler module "listening" for such an event.

Upon being notified of the change, the tree assembler module may determine whether the insertion is relevant (e.g., change the current display). In some cases, the tree assembler module may only generate user interface elements to fill one screen or display at a time and thus if the change to the object collection results in an insertion into an "off-screen" area, then the tree assembler module may determine that the change is not relevant for the current display and do nothing. If however, the tree assembler module determines that the change is relevant, then the tree assembler module generates or changes the visual tree to include the new objects data items and inserts the new user interface elements in the correct place within the visual tree. The new data object will get styled as described above and the visual tree will be passed to the rendering engine to be displayed.

Similarly, when an item is removed from the object collection, the tree assembler module may be notified and, in response, determine the relevance of the removal. If the removal is relevant, the tree assembler module removes the corresponding user interface elements from the visual tree and thus rebuilds the visual tree. Again, the new tree is passed to the rendering engine for display rendering. In an embodiment, a collection change relates to a "refresh" when an object collection is changed in some way. For example, when an application program sorts a collection, the collection may send a refresh notification to the system which causes the tree assembler module to rebuild the visual tree according to the new order of the data items.

When the item style property is changed, a notification is sent to the tree assembler module as well. In some cases the item style may have been used in styling many different objects such that the tree assembler module must determine whether changes are relevant and where. If relevant, re-styling in all the necessary locations occurs potentially resulting in a new user interface being displayed according to the new style. Accordingly, the same process occurs when the item style selector property changes as well.

In another method for an embodiment of data association, dynamic changes to items and styles begin when a change has been made to an object collection that is currently being displayed and/or is being prepared for display. The changes to the object collection may relate to the addition of an object, the deletion of an object or a change to an existing object, wherein the change relates to data that is to be displayed. The method may also apply when a change is made either to an item style or a style selector that applies to the present display or present visual tree.

A visual tree is an internal representation of the data to be displayed and, because that data has changed due to a change to the object collection or to the defined styles, the visual tree is no longer valid and is invalidated. Such an invalidation may involve the setting or clearing of a bit to indicate that the present visual tree is no longer valid. The visual tree is recognized as no longer being valid which may relate to the tree assembler module being notified of the invalidation operation, or the tree assembler module may listen for the type of event.

When the visual tree is invalidated, a determination is made as to whether the change is relevant by comparing against the current display to determine if the change would cause a change in the current display. If the change is relevant, a rebuild operation begins rebuilding the entire visual tree as described above, to incorporate the change. In other embodiments, the rebuild operation simply identifies where the visual tree should change and makes those changes. Upon rebuilding the tree, the tree is passed to the rendering engine to cause the actual presentation of the display (e.g., re-rendering the display). As described, the visual tree may be passed to a layout engine for added user interface elements prior to passing to the rendering engine.

The objects in a set may be managed as a collection and additional user interface elements may be added through the use of a defined style to a "group" of objects. The definition of the group, and how the group-level user interface elements look, may therefore be independent of the group itself. In an embodiment, an application program 202 may provide the ability to display a second list region 216 that includes details 218 of a listed item from a master list, such as list region 212. The details listed in list region 216 may display most or all of the data properties for a particular object, such as a client object, where the master list 212 only lists some of the data properties. It will be appreciated that when managing large numbers of data objects, a user may wish to only view the abbreviated set of data properties when viewing the list of different objects and, when a particular item is selected, the user may then wish to view all of the information. In an embodiment, the use of such a details window in combination with a master list is considered a "master-detail" implementation.

When a master data item changes dynamically (e.g., display element 214(1)), there is a need to accommodate the change by processing that item's associated detail items. To accommodate this change, data displayed in the detailed list region 216 is automatically updated because each of the displayed fields in the list region 216 are bound to the actual data records, just as the displayed fields in the list region 212.

Utilizing the systems and methods described for data association, an application program developer can apply many different and flexible data styling techniques to data used in the application. The defined data styles can be used for one or more different objects, and the application program developer can assign style information in a declarative manner (e.g., the systems and methods provide a declarative way to program how data looks when displayed and how an end user might interact with the user interface elements and underlying data). In doing so, the data is separated from the user interface elements and style definitions. Consequently, the developer or an end user may change the data objects without changing the user interface elements. Likewise, the developer may alter or change the user interface elements without changing the data objects.

Methods for data association, such as exemplary method 300 described with reference to FIG. 3 may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3A:
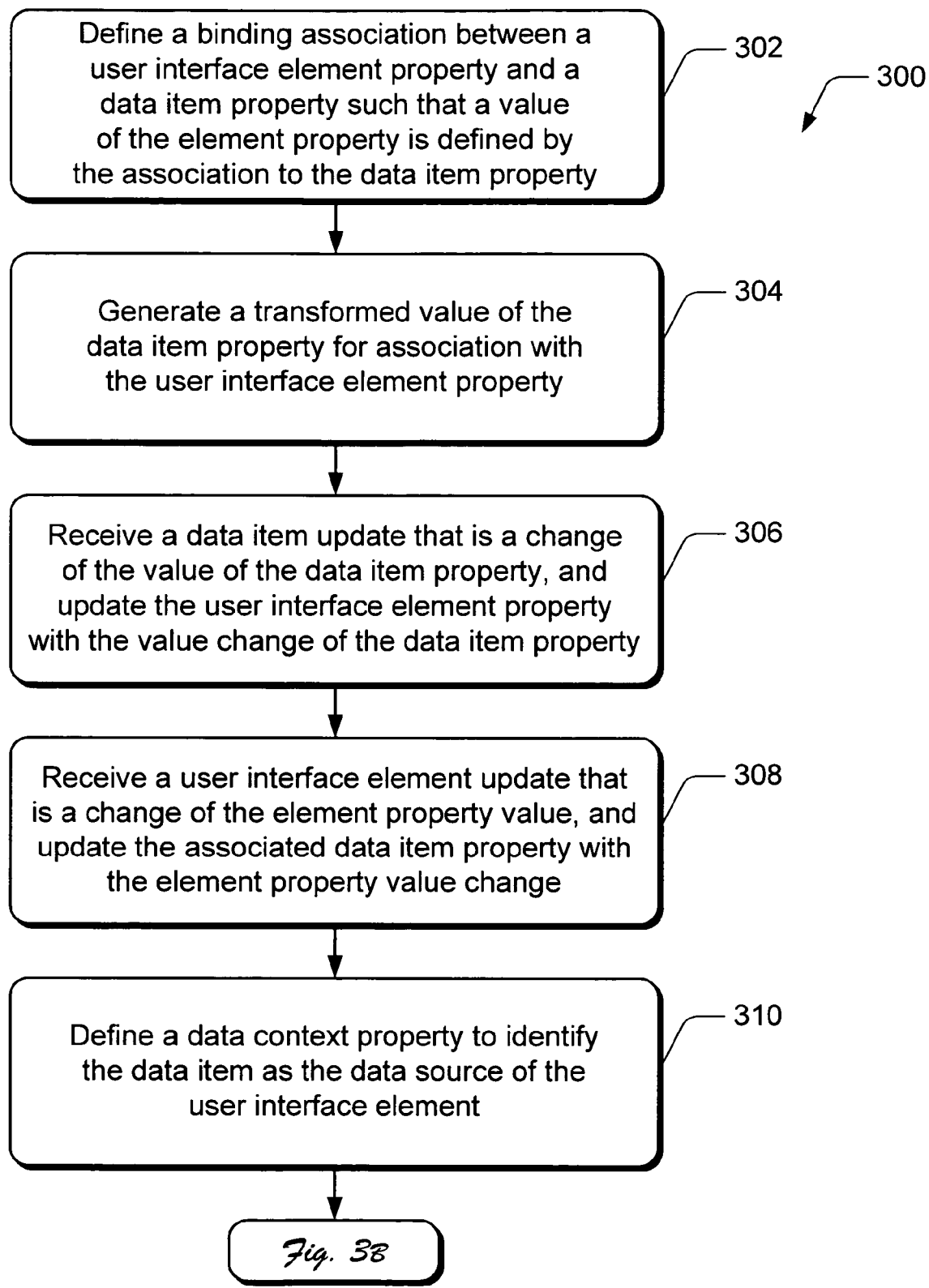

FIGS. 3A and 3B illustrate an exemplary method 300 for an embodiment of data association. The order in which the method is described is not intended to be construed as a limitation, and any number of the described method blocks can be combined in any order to implement the method. Furthermore, the method can be implemented in any suitable hardware, software, firmware, or combination thereof.

At block 302 (FIG. 3A), a binding association is defined between an element property of a user interface element and a data item property such that a value of the element property is defined by the association to the data item property. For example, binding definition 226 (FIG. 2) associates an element property of a user interface element 214(1) and a data item property such that the reference number (e.g., a value) of the data item property is displayed by the user interface display element 214(1). The binding association defines a visual representation of the user interface element with the data item property such that the user interface element is displayed according to the associated value of the data item property.

The application program 202 which generates the user interface 206 can be developed independent of the data item 224. Further, the data item 224 having the data item property with the associated value for display on user interface 206 can be developed independent of display-related information for the user interface display element 214(1).

At block 304, a transformed value of the data item property is generated for association with the element property of the user interface element. For example, transform definition 228 transforms a value of the data item property (of data item 224), and the transformed value is associated with the element property of the user interface display element 222. The transformed value can be generated for compatible association with the element property of the user interface display element. Further, the transform definition 228 can be developed as a logic component of the application program 202 to generate the transformed value of the data item property. The value of the data item property is maintained unchanged in a data item database, such as storage media 112 (FIG. 1).

At block 306, a data item update is received that corresponds to a change of the associated value of the data item property, and the element property of the user interface display element is updated with the associated value change of the data item property. For example, the value of the data item property (of data item 224) can be changed and binding definition 226 updates the element property of the user interface display element 214(1) with the value change.

At block 308, a user interface element update is received that corresponds to a change of the value of the element property of the user interface element, and the associated data item property is updated with the value change of the element property of the user interface element. For example, the value of the element property of user interface display element 214(1) can be changed on user interface 206 and the data item property of data item 224 is updated with the value change.

At block 310, a data context property is defined to identify the data item as the data source of the user interface element, and at block 312 (FIG. 3B), an additional binding association is defined between an element property of an additional user interface element and an additional data item property of the data item where the additional user interface element has a dependent association to the user interface element, and where the additional binding association defaults to the data context property to identify the data item as the data source of the additional user interface element.

At block 314, a collection of data items is defined and a representation of the data items is developed for display in a list box of the user interface, where the list box is bound to the representation of the data items of the collection, and where the list box has display elements that are each associated with a referenced data item in the representation of the data items. Further, a collection 116 (FIG. 1) of data items 114 can also be defined to include a first representation of the data items 114 and at least a second different representation of the data items 114 where the first representation and the second different representation each reference the data items 114 in the collection 116.

At block 316, a data style definition is defined for a visual representation of the associated value of the data item property on the user interface. Further, the data style definition can be defined for a template of the user interface element to display the associated value of the data item property. An additional binding association can be defined to associate the data item property with the data style definition, and an additional binding association can be defined to associate data items with a data style definition that defines a visual representation of the data items as a data tree. At block 318, an instance of a data class is declared which corresponds to a type of data as a resource, where the binding definition is defined to include a reference to the data class in a declaration of the binding definition.

Figure 4:
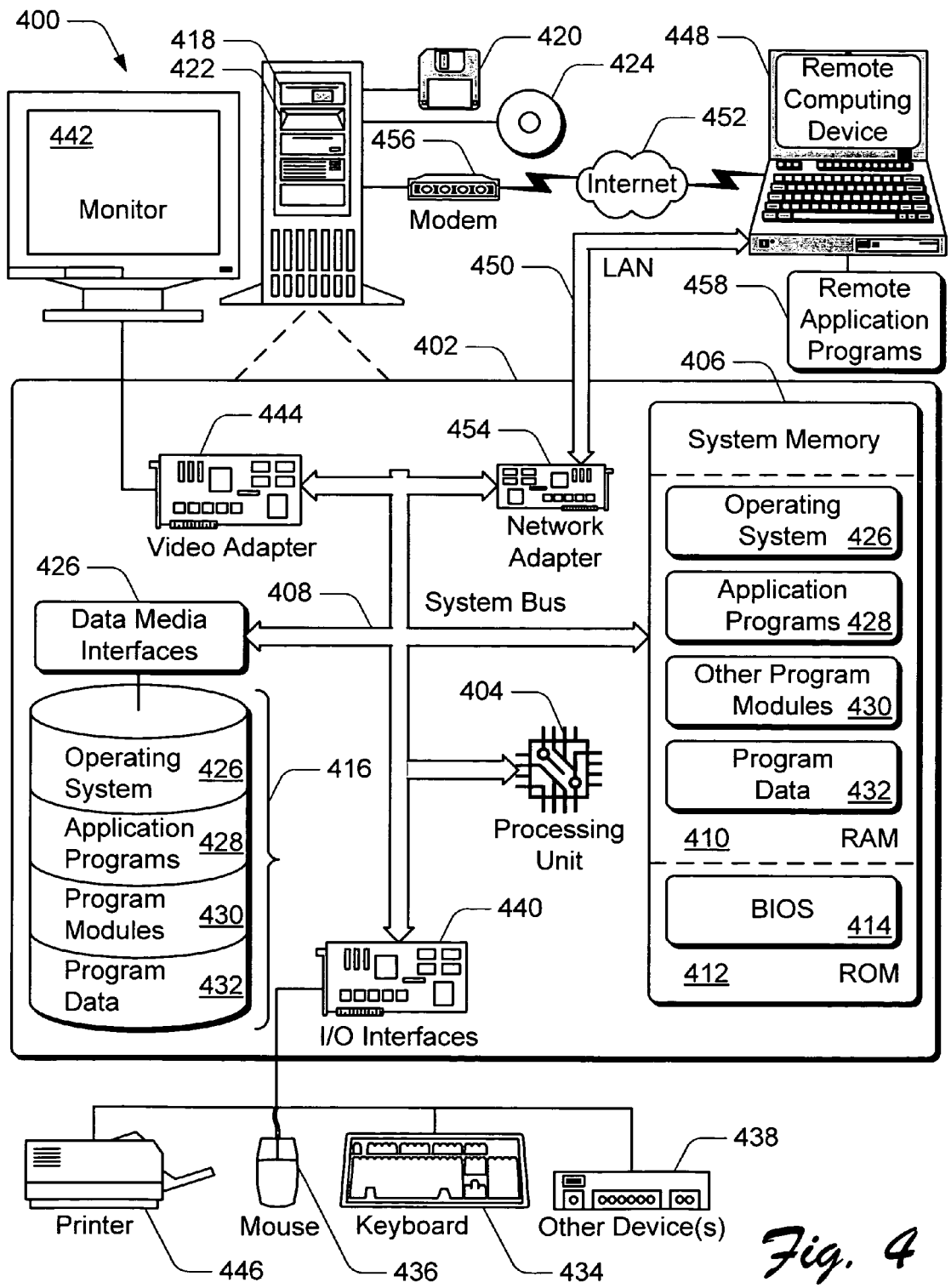
FIG. 4 illustrates exemplary computing systems, devices, and components in an environment that data association can be implemented.

FIG. 4 illustrates an exemplary computing environment 400 within which data association systems and methods, as well as the computing, network, and system architectures described herein, can be either fully or partially implemented. Exemplary computing environment 400 is only one example of a computing system and is not intended to suggest any limitation as to the scope of use or functionality of the architectures. Neither should the computing environment 400 be interpreted as having any dependency or requirement relating to any one or combination of components illustrated in the exemplary computing environment 400.

The computer and network architectures in computing environment 400 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 400 includes a general-purpose computing system in the form of a computing device 402. The components of computing device 402 can include, but are not limited to, one or more processors 404 (e.g., any of microprocessors, controllers, and the like), a system memory 406, and a system bus 408 that couples the various system components. The one or more processors 404 process various computer executable instructions to control the operation of computing device 402 and to communicate with other electronic and computing devices. The system bus 408 represents any number of several types of bus structures, including a memory bus or memory controller, a peripheral bus, an accelerated graphics port, and a processor or local bus using any of a variety of bus architectures.

Computing environment 400 includes a variety of computer readable media which can be any media that is accessible by computing device 402 and includes both volatile and non-volatile media, removable and non-removable media. The system memory 406 includes computer-readable media in the form of volatile memory, such as random access memory (RAM) 410, and/or non-volatile memory, such as read only memory (ROM) 412. A basic input/output system (BIOS) 414 maintains the basic routines that facilitate information transfer between components within computing device 402, such as during start-up, and is stored in ROM 412. RAM 410 typically contains data and/or program modules that are immediately accessible to and/or presently operated on by one or more of the processors 404.

Computing device 402 may include other removable/non-removable, volatile/non-volatile computer storage media. By way of example, a hard disk drive 416 reads from and writes to a non-removable, non-volatile magnetic media (not shown), a magnetic disk drive 418 reads from and writes to a removable, non-volatile magnetic disk 420 (e.g., a "floppy disk"), and an optical disk drive 422 reads from and/or writes to a removable, non-volatile optical disk 424 such as a CD-ROM, digital versatile disk (DVD), or any other type of optical media. In this example, the hard disk drive 416, magnetic disk drive 418, and optical disk drive 422 are each connected to the system bus 408 by one or more data media interfaces 426. The disk drives and associated computer readable media provide non-volatile storage of computer readable instructions, data structures, program modules, and other data for computing device 402.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, application programs 428, other program modules 430, and program data 432 (or some combination thereof) may include an embodiment of the systems and methods described herein.

Computing device 402 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 402 via any number of different input devices such as a keyboard 434 and pointing device 436 (e.g., a "mouse"). Other input devices 438 (not shown specifically) may include a microphone, joystick, game pad, controller, satellite dish, serial port, scanner, and/or the like. These and other input devices are connected to the processors 404 via input/output interfaces 440 that are coupled to the system bus 408, but may be connected by other interface and bus structures, such as a parallel port, game port, and/or a universal serial bus (USB).

A monitor 442 or other type of display device can be connected to the system bus 408 via an interface, such as a video adapter 444. In addition to the monitor 442, other output peripheral devices can include components such as speakers (not shown) and a printer 446 which can be connected to computing device 402 via the input/output interfaces 440.

Computing device 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computing device 402.

Logical connections between computing device 402 and the remote computing device 448 are depicted as a local area network (LAN) 450 and a general wide area network (WAN) 452. Such networking environments are commonplace in offices, enterprise-wide computer networks, intranets, and the Internet. When implemented in a LAN networking environment, the computing device 402 is connected to a local network 450 via a network interface or adapter 454. When implemented in a WAN networking environment, the computing device 402 typically includes a modem 456 or other means for establishing communications over the wide area network 452. The modem 456, which can be internal or external to computing device 402, can be connected to the system bus 408 via the input/output interfaces 440 or other appropriate mechanisms. The illustrated network connections are exemplary and other means of establishing communication link(s) between the computing devices 402 and 448 can be utilized.

In a networked environment, such as that illustrated with computing environment 400, program modules depicted relative to the computing device 402, or portions thereof, may be stored in a remote memory storage device. By way of example, remote application programs 458 are maintained with a memory device of remote computing device 448. For purposes of illustration, application programs and other executable program components, such as the operating system 426, are illustrated herein as discrete blocks, although it is recognized that such programs and components reside at various times in different storage components of the computing device 402, and are executed by the processors 404 of the computing device.

Data Association Binding & System Windows Data

This namespace includes classes and interfaces used for binding properties to data sources, data source classes, data-specific implementations of collections and views, and handling exceptions in data entry. The following lists the members exposed by the System.Windows.Data namespace.

Classes

ArrayListCollectionView encapsulates the collection view support for the ArrayListDataCollection collection class. This class cannot be inherited.

ArrayListDataCollection provides a built-in implementation of an array-list data collection with an underlying collection-view interface. It also implements ICollectionChange to provide notification when items are added, items are removed, or the whole collection is refreshed.

Bind Represents a bind declaration object, used to manage bindings between a dynamic property user interface (UI) and source data.

Binding Provides access to the single run-time instance of a binding. This class cannot be inherited.

BindingListCollectionView—A collection view class used for Microsoft® ActiveX® Data Objects (ADO) data views.

CollectionContainer—Objects of this class hold an existing collection structure—for example, an ArrayListDataCollection or some other DataSet inside the ItemCollection.

ContextAffinityCollectionView—Implements a collection view that includes checks for context affinity.

DataContextObjectRef—Supports object references to elements whose DataContext is being used as the source for a binding. This class cannot be inherited.

DataSourceObjectRef—Supports object references to data sources. This class cannot be inherited.

DataTransferEventArgs—Encapsulates arguments for data transfer events. The events are routed events that must typically be handled specifically by a designated handler based on the DataTransferEventHandler delegate.

ElementObjectRef—Represents an object reference to an element, with the object being specified by its element ID. This class cannot be inherited.

ExplicitObjectRef—Represents an object reference to an explicit object. This class cannot be inherited.

ListCollectionView—Implements a collection view for collections based on IList.

ObjectDataSource—Serves as a data source for data binding. Bindable data items can be specified as common language runtime types.

ObjectRef—The abstract class that is used as the parent class of DataContextObjectRef, ElementObjectRef, Explicit ObjectRef, and TypeObjectRef.

ParameterCollection—Objects of this class hold the collection of named parameters (with their corresponding values) for an SqlDataSource.

QueryCommand—This class represents a single select statement to be submitted to the database.

RefreshCompletedEventArgs—Encapsulates the arguments passed either in the RefreshCompleted event of ObjectDataSource, or in the RefreshCompleted event of XmlDataSource.

SqlCommandList—A list of sql commands and the names of the tables that they should be used to fill.

SqlDataSource—SqlDataSource gets data from a Microsoft SQL Server for use in databinding.

TransformerSource—Allows resource reference to a transformer class that is defined as code-behind in the current application.

TypeObjectRef—Supports object reference by type. This class cannot be inherited.

WinFSDataSource—The WinFSDataSource facilitates databinding of data stored in WinFS with Avalon applications.

XmlDataNamespaceManager—XmlDataNamespaceManager Class Used to declare namespaces to be used in Xml data binding XPath queries.

XmlDataSource—Serves as a data source for data binding to Extensible Markup Language (XML) content nodes.

XmlNamespace—Declares an individual namespace within an XML data source.

Interfaces

IContains—Used to create classes that declare filtering criteria for collection views.

IDataSource—Supports creation of data source objects. Data source objects are used for common representation of data for data binding.

IDataTransformer—Provides methods that enable client-side transformation of bound data.

Enumerations

BindFlags—Describes special properties of a binding.

BindStatus—Status of a Binding.

BindType—Describes how changes in data values will transfer to and from source properties and target properties of a binding.

SqlDataSourceMode—The enumeration of the possible modes that SqlDataSource can have. The mode determines what sort of data is returned when the application retrieves the value from the Data property.

UpdateType—Specifies when updates to the data source (target-to-source data transfer) should occur in a binding. Setting these values will only be relevant if a binding's BindType is set to TwoWay (or defaults to TwoWay).

Delegates

DataChangedEventHandler—Represents the method that handles the DataChanged event raised by data sources that implement IDataSource.

DataTransferEventHandler—Represents the method that handles a data transfer event raised by Binding.

RefreshCompletedEventHandler—Represents the method that handles the ObjectDataSource.RefreshCompleted and XmlDataSource.RefreshCompleted events.

--- class sealed System.Windows.Data.ArrayListCollectionView :
ListCollectionView : ContextAffinityCollectionView :
CollectionView : Object Implements: IEnumerable ICollectionChange
ICurrentItem IComparer
{

-continued

```
protected virtual Void OnCollectionChanged(Object sender,
CollectionChangeEventArgs args)
protected virtual IList PrepareLocalArray(IList list)
}
        class System.Windows.Data.ArrayListDataCollection :
ArrayList : Object Implements: IList ICollection IEnumerable
ICloneable ICollectionChange
ICollectionViewFactory
{
public virtual Int32 Add(Object newItem)
public virtual Void AddRange(ICollection range)
public virtual Void Clear( )
public virtual sealed CollectionView CreateView( )
public virtual Void Insert(Int32 index, Object insertItem)
public virtual Void InsertRange(Int32 index, ICollection c)
public virtual Void Remove(Object removeItem)
public virtual Void RemoveAt(Int32 intex)
public virtual Void RemoveRange(Int32 index, Int32 count)
public virtual Void Reverse( )
public virtual Void SetRange(Int32 index, ICollection c)
public virtual Void Sort( )
}
```

Represents a bind declaration object, used to manage bindings between a dynamic property user interface (UI) and source data.

BeginDefer—Begins a defer cycle. Defer cycles are used to batch multiple bind declaration changes and improve performance.

Bind—Initializes a new instance of the Bind class. The Bind object represents the bind declaration of a binding.

EndDefer—Ends a defer cycle and updates the binding with the accumulated declaration changes made to the Bind declaration object.

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

IApplyValue.Apply—Applies the value to a property of an element. In this class, this method is not intended to be called directly.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

Properties

BindFlags—Gets or sets the flags that describe the binding.

BindType—Gets or sets the type of the binding.

Culture—Gets or sets the CultureInfo to use in a transformer associated with the binding (which may be the default transformer, if the Transformer property is not specifically set on the Bind object).

DataContextSource—Gets or sets the reference to another element that this element should use as source for the binding's data context.

DataSource—Gets or sets the object reference to the data source of the binding.

ElementSource—Gets or sets a string naming the identifier (ID) of another element in the application that should be used as the data source for the binding.

ObjectSource—Gets or sets the object reference to the data source of the binding.

Path—Gets or sets the description or name of the desired data property in the source, or an XPath query to desired data if the binding is to Extensible Markup Language (XML) data.

Source—Gets or sets the source object of the binding, as a special object reference object.

Transformer—Gets or sets a reference to the transformer to apply to the bound property.

UpdateType—Gets or sets the update type used in this bind declaration.

The Bind class is used to create and maintain the bind declaration. The declaration establishes the various base properties required for a typical binding, such as the source property, the type of the binding's update relationship of source vs. bound data, and other characteristics of a particular binding.

A Bind object's properties can be manipulated after the binding has been established, using C# calls to properties.

Properties of the Bind class closely parallel the *Bind syntax used for establishing a bind declaration in a particular markup language (named "XAML").

Bind to a Property

This example describes how to bind to a property using "XAML".

All bindings include the following:

Target element

Target dynamic property

Source object

Source property

In this case, the BoundColor property is the source property, myData is the source object, Button is the target element, and Background is the target property.

```
<DockPanel ID="root"
xmlns="http://schemas.microsoft.com/2003/xaml"
xmlns:def="Definition"
>
<DockPanel.Resources>
<ObjectDataSource def:Name="myDataSource"
TypeName="WCPSample.myData,BindNonTextPropertySample"/>
</DockPanel.Resources>
<DockPanel>
<DockPanel.DataContext>
<Bind DataSource="{myDataSource}"/>
</DockPanel.DataContext>
<Button
Background="*Bind(Path=BoundColor;BindTypeOneWay)"
Width="200"Height="30">I am RED!</Button>
</DockPanel>
</DockPanel>
```

Create a Binding

This example shows how to create a binding in C#. To do this, you attach the binding object for the SampleText source property in data to the Text property of the SimpleText element, mytext.

When calling the Bind constructor, you can pass the source object through the ExplicitObjectRef constructor to get an ObjectRef object. There are many possible signatures both for the Bind constructor and for the SetBinding convenience method, and it is even possible to create the entire binding with the convenience method without calling the Bind constructor at all, but this example splits the operation into the constructor piece and then the specific setting of that bind declaration on an individual property of an element. If you do this in two steps, then the bind declaration created as the intermediate can be reused for binding to more than one element in your application.

```
public void CreateBinding( )
{
    myDataObject = new myData(System.DateTime.Now);
    myBindDef = new Bind("MyDataProperty",
    BindType.TwoWay,
        new ExplicitObjectRef(myDataObject));
    mytext.SetBinding(SimpleText.TextProperty, myBindDef);
    ...
}
    class sealed System.Windows.Data.Bind : Object Implements:
IApplyValue
{
public Void BeginDefer( )
public Void EndDefer( )
public BindFlags get_BindFlags( )
public BindType get_BindType( )
public CultureInfo get_Culture( )
public String get_DataContextSource( )
public Object get_DataSource( )
public String get_ElementSource( )
public Object get_ObjectSource( )
public String get_Path( )
public ObjectRef get_Source( )
public IDataTransformer get_Transformer( )
public UpdateType get_UpdateType( )
virtual sealed Void System.Windows.IApplyValue.
Apply(DependencyObject
target, DependencyProperty dp)
public Void set_BindFlags(BindFlags value)
public Void set_BindType(BindType value)
public Void set_Culture(CultureInfo value)
public Void set_DataContextSource(String value)
public Void set_DataSource(Object value)
public Void set_ElementSource(String value)
public Void set_ObjectSource(Object value)
public Void set_Path(String value)
public Void set_Source(ObjectRef value)
public Void set_Transformer(IDataTransformer value)
public Void set_UpdateType(UpdateType value)
}
    enum sealed System.Windows.Data.BindFlags :
    Enum : ValueType :
Object Implements: IComparable IFormattable IConvertible
{
public static BindFlags NotifyOnTransfer
}
```

Get the Bind Declaration Object of a Binding Expression

Provides access to the single run-time instance of a binding. This class cannot be inherited.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetDataContext—Returns a data context. This method is a static accessor for a given binding's data context object.

GetHashCode—Serves as a hash function for a particular type, suitable for use in hashing algorithms and data structures like a hash table. Inherited from Object.

GetSources—Returns an array list of sources for the original binding expression.

GetType—Gets the Type of the current instance. Inherited from Object.

GetValue—Returns the evaluated value of a binding expression. This method is intended to be called statically.

GetView—Returns collection views of the data in the binding.

GetXmlNamespaceManager—Returns an Extensible Markup Language (XML) namespace manager object used by the binding attached to the provided element.

MemberwiseClone—Creates a shallow copy of the current Object. Inherited from Object.

OnAttach—Handles the notification that a binding expression has been set as a property's value. This method is called statically, but generally is not used by application code.

OnDetach—Handles the notification that a binding expression has been removed as a property's value. This method is called statically, but generally is not used by application code.

ReferenceEquals—Determines whether the specified Object instances are the same instance. Inherited from Object.

SetDataContext—Sets the data context of a binding for a given object/property combination. This method is intended to be called statically.

SetValue—Sets the value of a binding. Returns a value that indicates whether the given value could be accepted. This method is intended to be called statically.

SetXmlNamespaceManager—Sets a namespace manager object used by the binding attached to the provided element.

ToString—Returns a String that represents the current Object. Inherited from Object.

Update—Propagates the current value of the target property of a binding back to the source object.

Property Description

DataItem—Gets the data item currently in use by the binding. This could be a single object, or a collection, depending on the path conditions that established the binding.

DataSource—Gets the source of the binding, as a data source object. This might be an element from within the application or markup, or an external object that is specified as the data source resource.

ParentBind—Gets the Bind declaration object from which this Binding derived.

Status—Gets the status of a Binding.

Field Description

DataContextProperty—Declares the DependencyProperty for a binding's data context so that it can be set as a property in the *Bind syntax.

DataTransferEventID—A field that is used to identify the routing identifier (ID) for data transfer events. Reference this field statically.

XmlNamespaceManagerProperty—Declares the DependencyProperty for a binding's XML namespace manager, so that it can be set as a property in the *Bind syntax.

This class can be used to get the Bind Declaration Object of a Binding Expression, get the Status of a Binding, and control Updates to Data Bindings.

A related class, Bind, provides access to the bind declaration. The bind declaration is where you specify the property or path used in the binding and other declarations. The declaration can be specified either as properties of Bind or by using the bind declaration syntax in markup when first setting a DataContext on an element.

A Binding object can be obtained through the return value of calling GetBinding on a data bound object.

Get the Bind Declaration Object of a Binding Expression

The following C# example shows how to obtain the bind declaration object associated with a binding, by using the binding's target element and property. Having the bind declaration object available is useful because you may want to set or get properties that are carried in the declaration. Also, you could use this same declaration to qualify much of the bind declaration information needed for a totally different binding using the same data. To get the Bind declaration object, you need to get the Binding for a specified property on a target element. Then get the ParentBind property of the Binding object.

ChangedCurrent—Raises the implemented CurrentChanged event of the object. Inherited from CollectionView.

```
        Binding myBinding =mytext.GetBinding(SimpleText.TextProperty);
        if(myBinding!=null)
        {
        Bind myBindDec;
        myBindDec = myBinding.ParentBind;
        ... //now change properties of the bind declaration, or re-use it for
    another binding
        }
        class sealed System.Windows.Data.Binding : Expression : Object
{
public Object get_DataItem( )
public Object get_DataSource( )
public Bind get_ParentBind( )
public BindStatus get_Status( )
public static Object GetDataContext(DependencyObject d)
public virtual DependencySource[ ] GetSources( )
public virtual Object GetValue(DependencyObject d, DependencyProperty dp)
public static CollectionView GetView(Object collection)
public static CollectionView GetView(Object collection, String name)
public static Object GetXmlNamespaceManager(DependencyObject d)
public virtual Void OnAttach(DependencyObject d, DependencyProperty dp)
public virtual Void OnDetach(DependencyObject d, DependencyProperty dp)
public static Void SetDataContext(DependencyObject d, Object value)
public virtual Boolean SetValue(DependencyObject d, DependencyProperty dp,
Object value)
public    static    Void    SetXmlNamespaceManager(DependencyObject    d,
XmlNamespaceManager value)
public Void Update( )
public static readonlyDependencyProperty DataContextProperty
public static readonlyRoutedEventID DataTransferEventID
public static readonlyDependencyProperty XmlNamespaceManagerProperty
}
        enum sealed System.Windows.Data.Binding+BindStatus : Enum :
ValueType : Object Implements: IComparable IFormattable IConvertible
{
public static BindStatus Active
public static BindStatus Detached
public static BindStatus Inactive
public static BindStatus NoDataItem
public static BindStatus PathError
}
```

A collection view class used for Microsoft® ActiveX® Data Objects (ADO) data views.

Event Description

CollectionChanged occurs when the collection view changes. This could mean that items were added or removed in the collection, or that a new sort or filter was applied to this view. Inherited from CollectionView.

CurrentChanged occurs immediately after the record pointer position moves.

CurrentChanging occurs when a request is made to move the current record pointer. The requested move can be canceled by setting a handler and using the CancelEventArgs object within arguments of the event to cancel the event.

ProtectedCurrentChanged—A protected event. In derived classes, this event occurs after changing the position of the record pointer. Inherited from CollectionView.

ProtectedCurrentChanging—A protected event. In derived classes, this event occurs before a change in currency. If necessary, handlers of the event can cancel the change. Inherited from CollectionView.

Method Description

BindingListCollectionView—Initializes a new instance of the BindingListCollectionView class.

CheckUiContextAccess—Determines whether the calling thread is active within the context this collection view is bound to. Inherited from ContextAffinityCollectionView.

Compare—Return −, 0, or +, according to whether o1 occurs before, at, or after o2 (respectively)

Contains—Return true if the item belongs to this view. The item is assumed to belong to the underlying DataCollection; this method merely takes filters into account. It is used during collection-changed notifications, for instance.

ContainsItem—Return true if the item belongs to this view. No assumptions are made about the item. If the caller knows that the item belongs to the underlying collection, it is more efficient to call Contains.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Implementation of IEnumerable.GetEnumerator( ). This provides a way to enumerate the members of the collection without changing the currency.

GetHashCode—Serves as a hash function for a particular type, suitable for use in hashing algorithms and data structures like a hash table. Inherited from Object.

GetType—Gets the Type of the current instance. Inherited from Object.

IndexOf—Return the index where the given item belongs

MemberwiseClone—Creates a shallow copy of the current Object. Inherited from Object.

MoveFirst—Move Current to the first item.

MoveLast—Move Current to the last item.

MoveNext—Move Current to the next item.

MovePrevious—Move Current to the previous item.

MoveTo—Move Current to the given item.

OKToChangeCurrent—Determines whether it is allowable to change the position of the current record pointer. Inherited from CollectionView.

OnCollectionChanged—Implement this method to handle CollectionChanged events in the data collection that underlies the collection view. Inherited from CollectionView.

ReferenceEquals—Determines whether the specified Object instances are the same instance. Inherited from Object.

Refresh—Refreshes the view. Re-applies any current sort or filter operations, as set by various properties that declare sort or filter criteria.

ToString—Returns a String that represents the current Object. Inherited from Object.

VerifyUiContextAccess—Verifies that the calling thread is active within the context that this collection view is bound to. If not, an exception is raised. Inherited from ContextAffinityCollectionView.

Property Description

BOF—Return true if Current is before the beginning (Beginning-Of-File).

CanFilter—Gets a value that declares whether this view can be filtered on the basis of its Filter property. Inherited from CollectionView.

CanSort—Test if this CollectionView supports sorting before assigning a non-null value to Sort.

Collection—Gets the underlying data collection object. Inherited from CollectionView.

Comparer—Gets the comparison object being used by the collection view. Inherited from CollectionView.

Count—Return the estimated number of records (or −1, meaning "don't know").

Current—Return current item.

CurrentItem—Gets the current object in the data collection, by returning an object that implements a Current property as well as several other methods for moving or checking currency. Inherited from CollectionView.

EOF—Return true if Current is beyond the end (End-Of-File).

Filter—Gets or sets the filter applied to the data in a data collection view. Inherited from CollectionView.

Sort—Gets or sets the sort descriptions that apply a sort order to the collection.

UIContext—Gets the user interface (UI) context that this collection view is bound to. Inherited from ContextAffinityCollectionView.

ViewManagerData Gets implementation data about a view. Inherited from CollectionView.

```
class sealed System.Windows.Data.BindingListCollectionView
ContextAffinityCollectionView  :  CollectionView  :
Object Implements: IEnumerable ICollectionChange
ICurrentItem IComparer
{
public virtual sealed Int32 Compare(Object o1, Object o2)
```

-continued

```
public virtual Boolean Contains(Object item)
public virtual Boolean ContainsItem(Object item)
public virtual sealed Boolean get_BOF( )
public virtual Boolean get_CanSort( )
public virtual Int32 get_Count( )
public virtual sealed Object get_Current( )
public virtual sealed Boolean get_EOF( )
public virtual SortDescription[ ] get_Sort( )
public virtual IEnumerator GetEnumerator( )
public virtual Int32 IndexOf(Object item)
public virtual sealed Boolean MoveFirst( )
public virtual sealed Boolean MoveLast( )
public virtual sealed Boolean MoveNext( )
public virtual sealed Boolean MovePrevious( )
public virtual sealed Boolean MoveTo(Object item)
public virtual Void Refresh( )
public virtual Void set_Sort(SortDescription[ ] value)
}
       enum sealed System.Windows.Data.BindType : Enum :
ValueType : Object Implements: IComparable
IFormattable IConvertible
{
public static BindType OneTime
public static BindType OneWay
public static BindType TwoWay
}
```

Implements a collection view that includes checks for context affinity.

Event Description

CollectionChanged—Occurs when the collection view changes. This could mean that items were added or removed in the collection, or that a new sort or filter was applied to this view. Inherited from CollectionView.

ProtectedCurrentChanged—A protected event. In derived classes, this event occurs after changing the position of the record pointer. Inherited from CollectionView.

ProtectedCurrentChanging—A protected event. In derived classes, this event occurs before a change in currency. If necessary, handlers of the event can cancel the change. Inherited from CollectionView.

Method Description

ChangedCurrent—Raises the implemented CurrentChanged event of the object. Inherited from CollectionView.

CheckUiContextAccess—Determines whether the calling thread is active within the context this collection view is bound to.

Contains—Determines whether a given data item belongs to this collection view. Inherited from CollectionView.

ContainsItem—Determines whether a given data item belongs to this collection view or the unfiltered collection. Inherited from CollectionView.

ContextAffinityCollectionView—Create a view to given collection.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Returns an enumerator that can iterate through the collection view. Inherited from CollectionView.

GetHashCode—Serves as a hash function for a particular type, suitable for use in hashing algorithms and data structures like a hash table. Inherited from Object.

GetType—Gets the Type of the current instance. Inherited from Object.

IndexOf—Returns the index where the given data item belongs in the collection, or −1 if the index of that item is unknown. Inherited from CollectionView.

MemberwiseClone—Creates a shallow copy of the current Object. Inherited from Object.

OKToChangeCurrent—Determines whether it is allowable to change the position of the current record pointer. Inherited from CollectionView.

OnCollectionChanged—Implement this method to handle CollectionChanged events in the data collection that underlies the collection view. Inherited from CollectionView.

ReferenceEquals—Determines whether the specified Object instances are the same instance. Inherited from Object.

Refresh—Refreshes the view. Reapplies any current sort or filter conditions, as set by various properties that declare sort or filter criteria. Inherited from CollectionView.

ToString—Returns a String that represents the current Object. Inherited from Object.

VerifyUiContextAccess—Verifies that the calling thread is active within the context that this collection view is bound to. If not, an exception is raised.

Property Description

CanFilter—Gets a value that declares whether this view can be filtered on the basis of its Filter property. Inherited from CollectionView.

CanSort—Gets a value that declares whether the collection can be sorted on basis of its Sort property. Inherited from CollectionView.

Collection—Gets the underlying data collection object. Inherited from CollectionView.

Comparer—Gets the comparison object being used by the collection view. Inherited from CollectionView.

Count—Gets the count of records in the collection. Inherited from CollectionView.

CurrentItem—Gets the current object in the data collection, by returning an object that implements a Current property as well as several other methods for moving or checking currency. Inherited from CollectionView.

Filter—Gets or sets the filter applied to the data in a data collection view. Inherited from CollectionView.

Sort—Gets or sets the sort order within the data collection view. Inherited from CollectionView.

UIContext—Gets the user interface (UI) context that this collection view is bound to.

ViewManagerData—Gets implementation data about a view. Inherited from CollectionView.

```
        abstract class System.Windows.Data.
ContextAffinityCollectionView
: CollectionView : Object Implements: IEnumerable ICollectionChange
{
protected Boolean CheckUiContextAccess( )
protected UIContext get__UIContext( )
protected Void VerifyUiContextAccess( )
}
        class sealed System.Windows.Data.DataChangedEventHandler :
MulticastDelegate : Delegate : Object Implements:
ICloneable ISerializable
{
public virtual IAsyncResult BeginInvoke(Object sender, EventArgs args,
AsyncCallback callback, Object object)
public virtual Void EndInvoke(IAsyncResult result)
public virtual Void Invoke(Object sender, EventArgs args)
}
```

Supports object references to elements whose DataContext is being used as the source for a binding. This class cannot be inherited.

Method Description

DataContextObjectRef Initializes a new instance of the DataContextObjectRef class.

Equals Determines whether two Object instances are equal. Inherited from Object.

Finalize Allows an Object to attempt to free resources and perform other cleanup operations before the Object is reclaimed by garbage collection. Inherited from Object.

FindRootElement—Finds the root element for a given element. Inherited from ObjectRef.

GetDataObject—Returns the object that established data context for the specified object.

GetHashCode—Serves as a hash function for a particular type, suitable for use in hashing algorithms and data structures like a hash table. Inherited from Object.

GetObject—Returns the object that established data context for the specified object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

```
        class sealed System.Windows.Data.DataContextObjectRef :
ObjectRef : Object
{
public virtual Object GetDataObject(DependencyObject d)
public virtual Object GetObject(DependencyObject d)
}
        class sealed System.Windows.Data.DataSourceObjectRef :
ObjectRef : Object
{
public virtual Object GetDataObject(DependencyObject d)
public virtual Object GetObject(DependencyObject d)
}
```

Encapsulates arguments for data transfer events. The events are routed events that must typically be handled specifically by a designated handler based on the DataTransferEventHandler delegate.

Property Description

Handled—Sets or retrieves a value that indicates the present state of the event handling. Inherited from RoutedEventArgs.

OriginalSource—Returns OriginalSource object that raised the RoutedEvent. Inherited from RoutedEventArgs.

Property—Gets the specific property that changed and caused the data transfer event to be raised.

RoutedEventID—Returns the RoutedEventID associated with this RoutedEventArgs. Inherited from RoutedEvent Args.

Source—Gets the object that raised the event. Inherited from RoutedEventArgs.

Field Description

Empty—Represents an event with no event data. Inherited from EventArgs.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

InvokeEventHandler—Raises the data transfer event.

MemberwiseClone—Creates a shallow copy of the current Object. Inherited from Object.

OnSetSource—Invoked when the source of the event is set. Inherited from RoutedEventArgs.

ReferenceEquals—Determines whether the specified Object instances are the same instance. Inherited from Object.

SetRoutedEventID—Sets the RoutedEventID to the specified value Inherited from RoutedEventArgs.

SetSource—Sets the Source Property to the specified value Inherited from RoutedEventArgs.

ToString—Returns a String that represents the current Object. Inherited from Object.

```
        class    System.Windows.Data.DataTransferEventArgs    :
RoutedEventArgs : EventArgs : Object
{
public DependencyProperty get_Property( )
protected virtual Void InvokeEventHandler(Delegate
genericHandler, Object
genericTarget)
}
```

Represents the method that handles a data transfer event raised by Binding.

Parameters sender—System.Object. The source object (instance of Binding) that raised the event.

args—System.Windows.Data.DataTransferEventArgs. Arguments of the event, as an instance of DataTransferEvent Args.

Return Value

System.Void.

Arguments of the event will inform you which bound property within the binding transferred data.

Binding does not expose this event as a member, but does expose the static DataTransferEventID property that is used to identify the event and attach a handler to that event.

How do I Notify when Data is Transferred?

This example describes how to set up notification when data is transferred from the source to the target property.

According to one embodiment the operating system "Avalon" raises a data transfer event each time that data transfers from the source of a binding to a target. Internally, this event is used to inform the user interface (UI) that it should update, because the bound data has changed. Note that in order for the data transfer event to work, and also in order for one-way or two-way binding to work properly, you need to implement your data class using the IPropertyChange interface. For details on creating data items or classes that implement this interface, see Create a One-Way Binding to a Dynamically Updated Data Source.

In order to make this event available to your application, set the NotifyOnTransfer flag in the bind declaration. This can be done in a particular markup language (named "XAML"), using either the *Bind syntax or the BindFlags attribute of Bind, or in C#, by using parameters of the bind declarations.

The handler you use to listen for this event must typically be attached directly to the element where you want to be informed of changes, or to the overall data context if you want to be aware that anything in the context has changed.

```
    <SimpleText ID="RentText"
        Text="*Bind(Path=Rent;BindType=Oneway;BindFlags=
NotifyOnTransfer)"
        Canvas.Top="50px"    Canvas.Left="140px"    Width="120px"
Height="20px" />
```

In the code, assign a handler based on the DataTransferEventHandler delegate, OnDataTransfer in this example, to handle the data transfer event. Use Binding.DataTransferEventID to get the necessary routing ID.

In this C# sample, clicking a button will cause new data to be generated and the values in various text boxes will be updated. When the event is raised and handled, a "Data Updated . . . " message is printed. Parameters of the event can be used to determine details about the property that changed (such as the type or the specific element if the same handler is attached to more than one element), which can be useful if there are multiple bound properties on a single element.

```
        RentText.AddHandler(Binding.DataTransferEventID,    new
DataTransferEventHandler(OnDataTransfer));
    ...
    public void OnDataTransfer(Object sender,
    DataTransferEventArgs args)
    {
    FrameworkElement fe = sender as FrameworkElement;
    InfoText.Text = "";
    InfoText.Text += args.Property.Name + " property of a " +
    args.Property.OwnerType.Name;
    InfoText.Text += " element (";
    InfoText.Text += fe.ID;
    InfoText.Text += ") updated...";
    InfoText.Text+=(String)System.DateTime.Now.ToLongDateString( );
    InfoText.Text += " at ";
    InfoText.Text+=(String)System.DateTime.Now.
    ToLongTimeString( );
    }
        class    sealed    System.Windows.
Data.DataTransferEventHandler    :    MulticastDelegate : Delegate :
Object Implements: ICloneable ISerializable
{
    public    virtual    IAsyncResult
    BeginInvoke(Object    sender,
DataTransferEventArgs args, AsyncCallback callback, Object object)
    public virtual Void EndInvoke(IAsyncResult result)
    public virtual Void Invoke(Object sender,
    DataTransferEventArgs args)
}
```

Represents an object reference to an element, with the object being specified by its element ID. This class cannot be inherited.

Method Description

ElementObjectRef—Initializes a new instance of the ElementObjectRef class.

Equals—Determines whether two Object instances are equal. Inherited from Object.

Finalize—Allows an Object to attempt to free resources and perform other cleanup operations before the Object is reclaimed by garbage collection. Inherited from Object.

FindRootElement—Finds the root element for a given element. Inherited from ObjectRef.

GetDataObject—Within derived classes, returns the data context object associated with the referenced object. Inherited from ObjectRef.

GetHashCode—Serves as a hash function for a particular type, suitable for use in hashing algorithms and data structures like a hash table. Inherited from Object.

GetObject—Returns the referenced object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

```
class sealed System.Windows.Data.ElementObjectRef : ObjectRef :
Object
{
public     virtual     Object     GetObject(DependencyObject     d)
}
```

Represents an explicit object reference to an element. This class cannot be inherited.

Method Description

Equals—Determines whether two Object instances are equal. Inherited from Object.

ExplicitObjectRef—Initializes a new instance of the ExplicitObjectRef class.

Finalize—Allows an Object to attempt to free resources and perform other cleanup operations before the Object is reclaimed by garbage collection. Inherited from Object.

FindRootElement—Finds the root element for a given element. Inherited from ObjectRef.

GetDataObject—Within derived classes, returns the data context object associated with the referenced object. Inherited from ObjectRef.

GetHashCode—Serves as a hash function for a particular type, suitable for use in hashing algorithms and data structures like a hash table. Inherited from Object.

GetObject—Returns the referenced object for the given DependencyObject context.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

This class is used to provide explicit references (by identifier (ID)) to objects used as source objects for bindings.

This class is a subclass of ObjectRef.

How do I Create a Binding?

This example shows how to create a binding in C#. To do this, you attach the binding object for the SampleText source property in data to the Text property of the SimpleText element, mytext.

When calling the Bind constructor, you can pass the source object through the ExplicitObjectRef constructor to get an ObjectRef object. There are many possible signatures both for the Bind constructor and for the SetBinding convenience method, and it is even possible to create the entire binding with the convenience method without calling the Bind constructor at all, but this example splits the operation into the constructor piece and then the specific setting of that bind declaration on an individual property of an element. If you do this in two steps, then the bind declaration created as the intermediate can be reused for binding to more than one element in your application.

```
public void CreateBinding( )
{
myDataObject = new myData(System.DateTime.Now);
myBindDef = new Bind("MyDataProperty", BindType.TwoWay,
   new ExplicitObjectRef(myDataObject));
mytext.SetBinding(SimpleText.TextProperty, myBindDef);
...
}
class sealed System.Windows.Data.ExplicitObjectRef : ObjectRef :
Object
{
public virtual Object GetObject(DependencyObject d)
}
   abstract interface System.Windows.Data.IContains
{
public virtual Boolean Contains(Object item)
}
   abstract interface System.Windows.Data.IDataSource
{
public virtual Object get_Data( )
public virtual Void Refresh( )
}
   abstract     interface     System.Windows.Data.IDataTransformer
{
public virtual Object InverseTransform(Object o, PropertyInfo info,
CultureInfo culture)
public virtual Object Transform(Object o, DependencyProperty dp,
CultureInfo culture)
}
```

Implements a collection view for collections based on IList.

Event Description

CollectionChanged—Occurs when the collection view changes. This could mean that items were added or removed in the collection, or that a new sort or filter was applied to this view. Inherited from CollectionView.

ProtectedCurrentChanged—A protected event. In derived classes, this event occurs after changing the position of the record pointer. Inherited from CollectionView.

ProtectedCurrentChanging—A protected event. In derived classes, this event occurs before a change in currency. If necessary, handlers of the event can cancel the change. Inherited from CollectionView.

Method Description

ChangedCurrent—Raises the implemented CurrentChanged event of the object. Inherited from CollectionView.

CheckUiContextAccess—Determines whether the calling thread is active within the context this collection view is bound to. Inherited from ContextAffinityCollectionView.

Contains—Determines whether a given data item belongs to this collection view.

ContainsItem—Determines whether a given data item belongs to this collection view or to the unfiltered collection.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Returns an enumerator that can iterate through the collection view.

GetHashCode—Serves as a hash function for a particular type, suitable for use in hashing algorithms and data structures like a hash table. Inherited from Object.

GetType—Gets the Type of the current instance. Inherited from Object.

IComparer.Compare—Implements the comparison algorithm used by sorting in this collection. This method is not intended to be called directly.

ICurrentItem.MoveFirst—Moves the record pointer to the first record in the collection view.

ICurrentItem.MoveLast—Moves the record pointer to the last record in the collection view.

ICurrentItem.MoveNext—Moves the record pointer to the next record in the collection view.

ICurrentItem.MovePrevious—Moves the record pointer to the previous record in the collection view.

ICurrentItem.MoveTo—Moves the record pointer to the specified record in the collection view.

IndexOf—Returns the index where the given data item belongs in the collection, or −1 if the index of that item is unknown.

ListCollectionView—Initializes a new instance of the ListCollectionView class, using a supplied IList-derived collection.

MemberwiseClone—Creates a shallow copy of the current Object. Inherited from Object.

OKToChangeCurrent—Determines whether it is allowable to change the position of the current record pointer. Inherited from CollectionView.

OnCollectionChanged—Implement this method to handle CollectionChanged events in the data collection that underlies the collection view. Inherited from CollectionView.

PrepareLocalArray—Creates, filters and sorts the local index array. This method is also called when you call Refresh.

ReferenceEquals—Determines whether the specified Object instances are the same instance. Inherited from Object.

Refresh—Refreshes the view. Re-applies any current sort or filter operations, as set by various properties that declare sort or filter criteria.

ToString—Returns a String that represents the current Object. Inherited from Object.

VerifyUiContextAccess—Verifies that the calling thread is active within the context that this collection view is bound to. If not, an exception is raised. Inherited from ContextAffinityCollectionView.

Property Attribute Description

ActiveComparer—Gets the current active comparer used in sorting.

ActiveFilter—Gets the current active Contains information used in filtering.

CanFilter—Gets a value that declares whether this view can be filtered on the basis of its Filter property. Inherited from CollectionView.

CanSort—Gets a value that declares whether the collection can be sorted on the basis of its Sort property.

Collection—Gets the underlying data collection object. Inherited from CollectionView.

Comparer—Gets the comparison object being used by the collection view. Inherited from CollectionView.

Count—Gets the count of records in the collection.

CurrentIndex—Gets or sets the current index.

CurrentItem—Gets the current object in the data collection, by returning an object that implements a Current property as well as several other methods for moving or checking currency. Inherited from CollectionView.

CustomFilter—Gets or sets the custom filter criteria applied to the collection by the view.

CustomSort—Gets or sets the custom sort order applied to the collection by the view.

Filter—Gets or sets the filter applied to the data in a data collection view. Inherited from CollectionView.

InternalList—Gets or sets the internal (complete, unfiltered) collection.

Sort—Gets or sets the sort descriptions that apply a sort order to the collection.

UIContext—Gets the user interface (UI) context that this collection view is bound to. Inherited from ContextAffinityCollectionView.

UsesLocalArray—Gets a Boolean value that indicates whether sorting or filtering is taking place either on a local array copy or on the original data.

ViewManagerData—Gets implementation data about a view. Inherited from CollectionView.

```
class     System.Windows.Data.ListCollectionView     :
ContextAffinityCollectionView  :  CollectionView  :  Object Implements:
IEnumerable ICollectionChange ICurrentItem IComparer
{
public virtual Boolean Contains(Object item)
public virtual Boolean ContainsItem(Object item)
protected IComparer get_ActiveComparer( )
protected IContains get_ActiveFilter( )
public virtual Boolean get_CanSort( )
public virtual Int32 get_Count( )
protected Int32 get_CurrentIndex( )
public IContains get_CustomFilter( )
public IComparer get_CustomSort( )
protected IList get_InternalList( )
public virtual SortDescription[ ] get_Sort( )
protected Boolean get_UsesLocalArray( )
public virtual IEnumerator GetEnumerator( )
public virtual Int32 IndexOf(Object item)
virtual sealed Void
System.ComponentModel.ICurrentItem.add_CurrentChanged
(CurrentChangedEventHandler value)
virtual sealed Void
System.ComponentModel.ICurrentItem.add_CurrentChanging
(CurrentChangingEventHandler value)
virtual sealed Boolean
System.ComponentModel.ICurrentItem.get_BOF( )
virtual sealed Object
System.ComponentModel.ICurrentItem.get_Current( )
virtual sealed Boolean
System.ComponentModel.ICurrentItem.get_EOF( )
virtual sealed Boolean
System.ComponentModel.ICurrentItem.MoveFirst( )
virtual sealed Boolean
System.ComponentModel.ICurrentItem.MoveLast( )
virtual sealed Boolean
System.ComponentModel.ICurrentItem.MoveNext( )
virtual sealed Boolean
System.ComponentModel.ICurrentItem.MovePrevious( )
virtual sealed Boolean
System.ComponentModel.ICurrentItem.MoveTo(Object item)
virtual sealed Void
System.ComponentModel.ICurrentItem.remove_CurrentChanged
(CurrentChangedEventHandler value)
virtual sealed Void
System.ComponentModel.ICurrentItem.remove_CurrentChanging
(CurrentChangingEventHandler value)
protected virtual IList PrepareLocalArray(IList list)
public virtual Void Refresh( )
protected Void set_ActiveComparer(IComparer value)
protected Void set_ActiveFilter(IContains value)
protected Void set_CurrentIndex(Int32 value)
public Void set_CustomFilter(IContains value)
public Void set_CustomSort(IComparer value)
protected Void set_InternalList(IList value)
public virtual Void set_Sort(SortDescription[ ] value)
virtual sealed Int32 System.Collections.IComparer.Compare(Object o1,
```

-continued

```
Object o2)
}
```

Serves as a data source for data binding. Bindable data items can be specified as common language runtime types.

Event Attribute Description

DataChanged—Raised when a new data object becomes available.

RefreshCompleted—Raised when the refresh operation has completed. This event is raised only if the data source is using Asynchronous mode.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ObjectDataSource—Initializes a new instance of the ObjectDataSource class.

ReferenceEquals—Determines whether the specified Object instances are the same instance. Inherited from Object.

Refresh—Creates the mid-tier data object based on the current value of the TypeName and Parameters properties. This method gets called automatically upon the first request for the data.

ToString—Returns a String that represents the current Object. Inherited from Object.

Property Attribute Description

Asynchronous—Gets or sets a property that declares whether data object creation will be performed in a worker thread or in the active (UI) context.

Data—Gets the underlying data object.

Parameters—Gets or sets a comma-delimited string that describes the arguments to be passed to the constructor of the instantiated object.

TypeName—Gets or sets the name of the common language runtime type to instantiate. This can be a fully-qualified type name, or a type defined locally in the assembly of the page.

```
class System.Windows.Data.ObjectDataSource : Object Implements:
IDataSource
{
public Boolean get_Asynchronous( )
public virtual sealed Object get_Data( )
public String get_Parameters( )
public String get_TypeName( )
public virtual sealed Void Refresh( )
public Void set_Asynchronous(Boolean value)
public Void set_Parameters(String value)
public Void set_TypeName(String value)
}
```

The abstract class that is used as the parent class of ElementObjectRef, ExplicitObjectRef, and TypeObjectRef Method Description Equals—Determines whether two Object instances are equal. Inherited from Object.

Finalize—Allows an Object to attempt to free resources and perform other cleanup operations before the Object is reclaimed by garbage collection. Inherited from Object.

FindRootElement—Finds the root element for a given element.

GetDataObject—Within derived classes, returns the data context object associated with the referenced object.

GetHashCode—Serves as a hash function for a particular type, suitable for use in hashing algorithms and data structures like a hash table. Inherited from Object.

GetObject—Within derived classes, returns the data context object associated with the referenced object.

GetType—Gets the Type of the current instance. Inherited from Object.

MemberwiseClone—Creates a shallow copy of the current Object. Inherited from Object.

ObjectRef—Initializes a new instance of the ObjectRef class. This method is protected in the base class.

ReferenceEquals—Determines whether the specified Object instances are the same instance. Inherited from Object.

ToString—Returns a String that represents the current Object. Inherited from Object.

```
abstract class System.Windows.Data.ObjectRef : Object
{
protected static DependencyObject
FindRootElement(DependencyObject d)
public virtual Object GetDataObject(DependencyObject d)
public virtual Object GetObject(DependencyObject d)
}
```

Objects of this class hold the collection of named parameters (with their corresponding values) for an SqlDataSource.

Method Description

Add—Adds a named parameter to the parameter collection given the new parameter's name and value.

CopyTo—Copies all of the parameters in the parameter collection to a specified array, starting at a specified index in the array.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Gets an IEnumerator interface that can be used to enumerate over the parameters in the collection.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ParameterCollection—Initiates a new instance of the ParameterCollection class.

ReferenceEquals—Determines whether the specified Object instances are the same instance. Inherited from Object.

ToString—Returns a String that represents the current Object. Inherited from Object.

Property Description

Count—Gets the count of parameters in this parameter collection.

IsSynchronized—Gets a value that indicates whether access to this collection is synchronized (i.e., thread-safe).

Item—An indexer that gets or sets the object value of a named parameter in the collection.

SyncRoot—Gets an object that can be used to synchronize access to this parameter collection.

```
class System.Windows.Data.ParameterCollection : Object
Implements: ICollection IEnumerable
{
public Void Add(String paramName, Object initialValue)
public virtual sealed Void CopyTo(Array array, Int32 index)
public virtual sealed Int32 get_Count( )
public virtual sealed Boolean get_IsSynchronized( )
public Object get_Item(String paramName)
public virtual sealed Object get_SyncRoot( )
public virtual sealed IEnumerator GetEnumerator( )
public Void set_Item(String paramName, Object value)
}
```

This class represents a single select statement to be submitted to the database.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

QueryCommand—Default constructor does nothing ReferenceEquals—Determines whether the specified Object instances are the same instance. Inherited from Object.

ToString—Returns a String that represents the current Object. Inherited from Object.

Property Attribute Description

Table—Gets or sets the name of the table that will store query results.

Text—Gets or sets the Structured Query Language (SQL) query string of this query object.

```
class System.Windows.Data.QueryCommand : Object
{
public String get_Table( )
public String get_Text( )
public Void set_Table(String value)
public Void set_Text(String value)
}
```

Encapsulates the arguments passed either in the RefreshCompleted event of ObjectDataSource, or in the RefreshCompleted event of XmlDataSource.

Field Description

Empty—Represents an event with no event data. Inherited from EventArgs.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

RefreshCompletedEventArgs—Initializes a new instance of the RefreshCompletedEventArgs class.

ToString—Returns a String that represents the current Object. Inherited from Object.

Property Description

Exception—Gets the exception raised if the refresh operation resulted in an error.

```
class System.Windows.Data.RefreshCompletedEventArgs :
EventArgs : Object
{
public Exception get_Exception( )
}
```

Represents the method that handles the ObjectDataSource.RefreshCompleted and XmlDataSource.RefreshCompleted events.

Parameters sender System.Object. The object (data source) that raised the event.

e System.Windows.Data.RefreshCompletedEventArgs. Arguments of the event, as an instance of RefreshCompletedEventArgs.

Return Value System.Void.

```
class sealed System.Windows.Data.RefreshCompletedEventHandler
:MulticastDelegate : Delegate : Object Implements: ICloneable
ISerializable
{
    public virtual IAsyncResult BeginInvoke(Object sender,
RefreshCompletedEventArgs e, AsyncCallback callback, Object object)
    public virtual Void EndInvoke(IAsyncResult result)
    public virtual Void Invoke(Object sender,
    RefreshCompletedEventArgs e)
}
```

A list of sql commands and the names of the tables that they should be used to fill.

Method Description

Add—Adds a new SqlCommand object to the list.

AddChild—This method is called to add a child to this object.

AddText—This method is called when plain text appears under the tag in markup. In this case it is ignored.

Clear—Removes all entries in the list.

Contains—Determines if the specified QueryCommand is in the array. Both the Text and Table values must typically be equal to count as a match.

CopyTo—Copies the entire SqlCommandList to the specified one dimentional array starting at the specified index of the target array.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Returns an enumerator which enumerates all QueryCommands in this set GetHashCode—Serves as a hash function for a particular type, suitable for use in hashing algorithms and data structures like a hash table. Inherited from Object.

GetType—Gets the Type of the current instance. Inherited from Object.

IList.Add

IList.Contains

IList.IndexOf

IList.Insert

IList.Remove

IndexOf—Returns the zero-based index of the first occurance of the specified value.

MemberwiseClone—Creates a shallow copy of the current Object. Inherited from Object.

ReferenceEquals—Determines whether the specified Object instances are the same instance. Inherited from Object.

Remove—Removes the first occurance of the specified QueryCommand from the list.

RemoveAt—Removes the QueryCommand at the given position.

SqlCommandList

ToString—Returns a String that represents the current Object. Inherited from Object.

Property Description

Count—Returns the number of elements contained in the list.

Item—Returns the QueryCommand at the given index.

```
class System.Windows.Data.SqlCommandList : Object Implements:
IList ICollection IEnumerable IAddChild
{
public Void Add(QueryCommand command)
public virtual sealed Void AddChild(Object o)
public virtual sealed Void AddText(String s)
public virtual sealed Void Clear( )
public Boolean Contains(QueryCommand value)
public virtual sealed Void CopyTo(Array array, Int32 index)
public virtual sealed Int32 get_Count( )
public QueryCommand get_Item(Int32 index)
public virtual sealed IEnumerator GetEnumerator( )
public Int32 IndexOf(QueryCommand value)
public Void Remove(QueryCommand value)
public virtual sealed Void RemoveAt(Int32 index)
public Void set_Item(Int32 index, QueryCommand value)
virtual sealed Boolean
System.Collections.ICollection.get_IsSynchronized( )
virtual sealed Object System.Collections.ICollection.get_SyncRoot( )
virtual sealed Int32 System.Collections.IList.Add(Object command)
virtual sealed Boolean System.Collections.IList.Contains(Object value)
virtual sealed Boolean System.Collections.IList.get_IsFixedSize( )
virtual sealed Boolean System.Collections.IList.get_IsReadOnly( )
virtual sealed Object System.Collections.IList.get_Item(Int32 index)
virtual sealed Int32 System.Collections.IList.IndexOf(Object value)
virtual sealed Void System.Collections.IList.Insert(Int32 index, Object command)
virtual sealed Void System.Collections.IList.Remove(Object value)
virtual sealed Void System.Collections.IList.set_Item(Int32 index, Object value)
}
```

According to one embodiment, SqlDataSource gets data from a Microsoft SQL Server for use in databinding.

Event Attribute Description

DataChanged—This event is raised when a new data object becomes available.

WriteComplete—This event is fired when data has been written back to the database.

Method Description

BeginParamChange—Temporarily defers any updates to the dataset (unless requested explicitly with Refresh( )) until the EndParamChange method is called EndParamChange—Signals that parameters have been updated and that the dataset should be refreshed from the Sql server. This will not refresh the dataset if none of the parameters have been changed. To update the dataset unconditionally use the Refresh method.

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

Refresh—Initiates a Refresh Operation on the DataSource that will ultimately result in the Data property to change, if the Data property changes the DataChanged event should fire. This method is called automatically at the first request for the data SqlDataSource—The default constructor creates a new SqlDataSource with a blank connection string and a blank query ToString—Returns a String that represents the current Object. Inherited from Object.

WriteChanges—Commits the changes made to the data back to the database asynchronously.

Property Attribute Description

ConnectionString—This is the Sql server connection string, it indicates things like where to find the sql server and what uid and password to use.

Data—Returns the underlying data object.

DataSet—This gives the developer access to the underlying DataSet so the functionality of ADO can be used if necessary DataSourceMode—The DataSourceMode determines what sort of object will be returned as the Data property.

DeferredParamChange—This flag indicates whether to refresh the data set immediately when a parameter's value changes or wait until EndParamChange( ) mehtod is called.

ReadResult—If an error happened when querying the database it can be viewed here Select—The collection of QueryCommand objects which are used to query the database.

SelectParameters—Exposes the ParameterCollection object which contains the names and values of all of the named parameters.

WriteResult—If an error happened when writing changes back to the database it can be viewed here

```
class System.Windows.Data.SqlDataSource : Object Implements:
IDataSource
{
public Void BeginParamChange( )
public Void EndParamChange( )
public String get_ConnectionString( )
public virtual sealed Object get_Data( )
public DataSet get_DataSet( )
public SqlDataSourceMode get_DataSourceMode( )
public Boolean get_DeferredParamChange( )
public Exception get_ReadResult( )
public SqlCommandList get_Select( )
public ParameterCollection get_SelectParameters( )
public Exception get_WriteResult( )
public virtual sealed Void Refresh( )
public Void set_ConnectionString(String value)
public Void set_DataSourceMode(SqlDataSourceMode value)
public Void WriteChanges( )
}
    enum    sealed    System.Windows.Data.SqlDataSource+
SqlDataSourceMode : Enum : ValueType : Object Implements:
IComparable IFormattable IConvertible
{
public static SqlDataSourceMode DataReader
public static SqlDataSourceMode DataSet
public static SqlDataSourceMode XmlReader
}
```

Allows resource reference to a transformer class that is defined as code-behind in the current application.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

IDataTransformer.InverseTransform—Aliases your custom transformer's InverseTransform method implementation. This method is not intended to be called directly.

IDataTransformer.Transform—Aliases your custom transformer's Transform method implementation. This method is not intended to be called directly.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

TransformerSource—Initializes a new instance of the TransformerSource class.

Property Description

TypeName—Gets or sets the assembly and class information for the transformer class that this TransformerSource instance is aliasing for.

How do I Transform Bound Data?

This example shows how to transform data that is used in bindings.

To transform data, you create a class that implements the IDataTransformer interface, which includes the Transform and InverseTransform methods.

In this C# example, the transformer works against two possible properties of a binding: the text within a text block and the foreground color. The same transformer can return either result as the appropriate type, based on switching on the dp input parameter. This is a useful feature in a transformer because the transformer is attached to a bind declaration, and the same bind declaration can be used to create multiple bindings on a single data source for properties of different destination types.

```
public class MyTransformer : IDataTransformer
{
public  object Transform(object  o,  DependencyProperty  dp,
System.Globalization.CultureInfo culture)
{
DateTime date = (DateTime)o;
switch (dp.Name) {
case "Text":
return  "Heute  ist  "  +  date.ToString("F",  new
System.Globalization.CultureInfo("de-DE"));
case "Foreground":
return Colors.Red;
default:
return o;
}
}
public    object    InverseTransform(object    o,
System.Reflection.PropertyInfo  info,  System.Globalization.CultureInfo
culture)
{
return null;
}
}
```

Using "XAML", a transformer class is an application resource. If the transformer code is written as code-behind inside the same application, the resource is created as a TransformerSource element. This TransformerSource element allows you to avoid a circular reference problem with trying to reference a custom element inside resources before the transformer class itself is compiled further down in the code. Then, to specify the transformer within a binding, set the transformer attribute to the resource name of your TransformerSource element in resources. This example uses compound syntax to set the binding, but the transformer can also be set in *Bind syntax.

```
<Canvas
xmlns="http://schemas.microsoft.com/2003/xaml"
xmlns:def="Definition"def:Language="C#"
def:Class="WCPSample.MarkupTransformer"
def:CodeBehind="default.xaml.cs"
ID="root"
>
<Canvas.Resources>
<ObjectDataSource    def:Name="myDataSource"
TypeName="WCPSample.myData,MarkupTransformerSample"/>
<TransformerSource    def:Name="MyTransformerReference"
TypeName="MyTransformer"/>
</Canvas.Resources>
<Canvas.DataContext>
<Bind DataSource="{myDataSource}"BindType="OneWay" />
</Canvas.DataContext>
<SimpleText Canvas.Top="10px" Canvas.Left="5px"
FontWeight="Bold"
FontSize="18" Text="Untransformed data"/>
<SimpleText Canvas.Top="30px" Canvas.Left="35px"
Width="300px" ID="mytext" Text="*Bind(Path=TheDate)"/>
<SimpleText Canvas.Top="50px" Canvas.Left="5px"
FontWeight="Bold"
FontSize="18" Text="Transformed data"/>
<SimpleText Canvas.Top="70px" Canvas.Left="35px"
Width="300px" Height="30px" ID="mytransformedtext">
<SimpleText.Text>
<Bind Path="TheDate" Transformer="
```

-continued

```
{MyTransformerReference}"/>
</SimpleText.Text>
<SimpleText.Foreground>
<Bind Path="TheDate" Transformer="
{MyTransformerReference}"/>
</SimpleText.Foreground>
</SimpleText>
</Canvas>
```

Using C#, you can specify the transformer when you create a new bind declaration object. Get an instance of your transformer by calling its constructor, and pass that instance as an argument to either a property of an existing bind declaration or in the bind declaration constructor. In the following example, myChangedData is a custom data item, which contains the TheDate property.

```
Bind myNewBindDef = new Bind(
    "TheDate",
    BindType.OneWay,
    new ExplicitObjectRef(myChangedData),
    UpdateType.Immediate,
    new MyTransformer( ),
    new System.Globalization.CultureInfo("en-US")
);
    class System.Windows.Data.TransformerSource    :    Object
Implements: IDataTransformer
{
public String get_TypeName( )
virtual sealed Object
System.Windows.Data.IDataTransformer.InverseTransform(Object o,
PropertyInfo info, CultureInfo culture)
    virtual sealed Object
    System.Windows.Data.IDataTransformer.Transform
(Object o, DependencyProperty dp, CultureInfo culture)
    public Void set_TypeName(String value)
}
```

Supports object reference by type. This class cannot be inherited.

Method Description

Equals—Determines whether two Object instances are equal. Inherited from Object.

Finalize—Allows an Object to attempt to free resources and perform other cleanup operations before the Object is reclaimed by garbage collection. Inherited from Object.

FindRootElement—Finds the root element for a given element. Inherited from ObjectRef.

GetDataObject—Within derived classes, returns the data context object associated with the referenced object. Inherited from ObjectRef.

GetHashCode—Serves as a hash function for a particular type, suitable for use in hashing algorithms and data structures like a hash table. Inherited from Object.

GetObject—Returns the object reference for a given data context.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

TypeObjectRef—Initializes a new instance of the TypeObjectRef class.

```
    class sealed System.Windows.Data.TypeObjectRef : ObjectRef :
Object
{
public virtual Object GetObject(DependencyObject d)
}
    enum sealed System.Windows.Data.UpdateType : Enum : ValueType
: Object Implements: IComparable IFormattable IConvertible
{
public static UpdateType Explicit
public static UpdateType Immediate
public static UpdateType OnLostFocus
}
```

The WinFSDataSource facilitates databinding of data stored in WinFS with Avalon applications.

Event Description

DataChanged—This event gets fired when new data is available or when that data changes DataUpdated—This event gets fired following a call to WriteChanges( )

Method Description

Dispose—If the client choses to dispose this object it will close the FindResult if it is still open. Otherwise it will be done in the finalizer.

Equals—Determines whether two Object instances are equal. Inherited from Object.

Finalize—The Finalizer will close the FindResult if it has not been closed earlier GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

Refresh—This method causes the query to be executed and new data to be returned. When the new data is ready the DataChanged event is fired.

ToString—Returns a String that represents the current Object. Inherited from Object.

Update—Writes any changes to the data back to the winfs store WinFSDataSource—Default constructor Property Description ContextString—Use this property to specify a WinFS store other than the default store.

Data—Returns the underlying data object

Query—The Query object

```
    class System.Windows.Data.WinFSDataSource    :    Object
Implements: IDataSource IDisposable
{
public virtual sealed Void Dispose( )
protected virtual Void Finalize( )
public String get_ContextString( )
public virtual sealed Object get_Data( )
public Query get_Query( )
public virtual sealed Void Refresh( )
public Void set_ContextString(String value)
public Void set_Query(Query value)
public Void Update( )
}
```

XmlDataNamespaceManager Class—Used to declare namespaces to be used in Xml data binding XPath queries.
Method Description
AddNamespace—Adds the given namespace to the collection. Inherited from XmlNamespaceManager.
AddText—IAddChild implementation
Equals—Determines whether two Object instances are equal. Inherited from Object.
Finalize—Allows an Object to attempt to free resources and perform other cleanup operations before the Object is reclaimed by garbage collection. Inherited from Object.
GetEnumerator—Provides support for the "foreach" style iteration over the collection of namespaces in the XmlNamespaceManager Inherited from XmlNamespaceManager.
GetHashCode—Serves as a hash function for a particular type, suitable for use in hashing algorithms and data structures like a hash table. Inherited from Object.
GetNamespacesInScope—Gets a collection of namespace names keyed by prefix which can be used to enumerate the namespaces currently in scope. Inherited from XmlNamespaceManager.
GetType—Gets the Type of the current instance. Inherited from Object.
HasNamespace—Gets a value indicating whether the supplied prefix has a namespace defined for the current pushed scope. Inherited from XmlNamespaceManager.
IAddChild.AddChild
LookupNamespace—Gets the namespace URI for the specified prefix. Inherited from XmlNamespaceManager.
LookupPrefix—Finds the prefix declared for the given namespace URI. Inherited from XmlNamespaceManager.
MemberwiseClone—Creates a shallow copy of the current Object. Inherited from Object.
PopScope—Pops a namespace scope off the stack. Inherited from XmlNamespaceManager.
PushScope—Pushes a namespace scope onto the stack. Inherited from XmlNamespaceManager.
ReferenceEquals—Determines whether the specified Object instances are the same instance. Inherited from Object.
RemoveNamespace—Removes the given namespace for the given prefix. Inherited from XmlNamespaceManager.
ToString—Returns a String that represents the current Object. Inherited from Object.
XmlDataNamespaceManager—Constructor
Property Description
DefaultNamespace—Gets the namespace URI for the default namespace. Inherited from XmlNamespaceManager.
NameTable—Gets the XmlNameTable associated with this object. Inherited from XmlNamespaceManager.

```
class System.Windows.Data.XmlDataNamespaceManager :
XmlNamespaceManager : Object Implements:
IXmlNamespaceResolver IEnumerable IAddChild
{
public virtual sealed Void AddText(String s)
virtual sealed Void
System.Windows.Serialization.IAddChild.AddChild(Object o)
}
```

Serves as a data source for data binding to Extensible Markup Language (XML) content nodes.
Event Attribute Description
DataChanged—Raise this event when a new data object becomes available.

RefreshCompleted—Notifies when the refresh operation has completed. This event is typically only raised if the data source is asynchronous, and that typically will only be the case when the XML source is an external file rather than inline XML.
Method Description
Equals—Determines whether two Object instances are equal. Inherited from Object.
Finalize—Allows an Object to attempt to free resources and perform other cleanup operations before the Object is reclaimed by garbage collection. Inherited from Object.
GetHashCode—Serves as a hash function for a particular type, suitable for use in hashing algorithms and data structures like a hash table. Inherited from Object.
GetType—Gets the Type of the current instance. Inherited from Object.
MemberwiseClone—Creates a shallow copy of the current Object. Inherited from Object.
Parse—Parses the object's XML content, using the specified reader and context.
ReferenceEquals—Determines whether the specified Object instances are the same instance. Inherited from Object.
Refresh—Resets the data collection maintained by this object, based on the result from the XPath query.
ToString—Returns a String that represents the current Object. Inherited from Object.
XmlDataSource—Initializes a new instance of the XmlDataSource class.
Property Attribute Description
Data—Gets the underlying data object. If the source of the data is an external file, the first access to this property will return null (because the data is handled asynchronously).
Document—Gets or sets the underlying data as an XML document. This is the property representation of any inline XML data established for this object.
Source—Gets or sets the Uniform Resource Identifier (URI) source of the external XML data used by this object.
XmlNamespaceManager—Gets or sets the mamespace manager used for executing XPath queries.
XPath—Gets or sets the XPath query used to produce an appropriate node list to use for data binding this object.
How do I Bind to Xml Data?
This example describes how to bind to data in an XML data source. You can bind to a data source that is an XML node or a collection of XML nodes. In this particular markup language (named "XAML") example, a data source is coded in an application's main "XAML" page as one of the resources of an outermost DockPanel. The actual XML data is supplied within the resource. This arrangement is sometimes called an XML data island.
The following example shows a very short XML data island that has a Books tree containing Book elements. The XmlDataSource resource is used to define the XML data source that contains the Books data.

```
<DockPanel xmlns="http://schemas.microsoft.com/2003/xaml/"
xmlns:def="Definition">
  <DockPanel.Resources>
    <XmlDataSource def:Name="BookData" XPath="/Books">
      <Books xmlns="">
        <Book ISBN="0-7356-0562-9" Stock="in">
          <Title>XML in Action</Title>
          <Summary>XML Web Technology</Summary>
        </Book>
        <Book ISBN="0-7356-1370-2" Stock="in">
```

-continued

```
<Title>Programming Microsoft Windows With C#</Title>
<Summary>C# Programming Using the .NET
Framework</Summary>
</Book>
<!-- ... other Book entries ... -->
</Books>
</XmlDataSource>
<Style def:Name="BookDataStyle">
<ContentPresenter/>
<Style.VisualTree>
<SimpleText FontSize="Small" Foreground="Black">
<SimpleText.Text>
<Bind Path="Title"/>
</SimpleText.Text>
</SimpleText>
</Style.VisualTree>
</Style>
</DockPanel.Resources>
<!-- Bind a ListBox to the query-selected books -->
<ListBox ItemStyle="{BookDataStyle }>
<ListBox.Items>
<CollectionContainer>
<CollectionContainer.Collection>
<Bind DataSource="{BookData}" Path="Book"/>
</CollectionContainer.Collection>
</CollectionContainer>
</ListBox.Items>
</ListBox>
</DockPanel>
```

An initial XPath query on the collection is coded by assigning the XPath attribute. This query string value will cause the data source to appear as a collection of data items. By varying the XPath query on the data source, the initial XML data collection that is exposed can be controlled. The XmlDataSource is also given an identifier (ID) by assigning BookData to the def:Name attribute.

A ListBox element can be used to bind to the XML data collection. The "XAML" markup above shows code for a ListBox that displays the titles of the books in the collection. A data style is defined that binds to the Title element of each Book element in the data. This style is defined in the main DockPanel's resources so it can be shared within the scope of that DockPanel. The Style is given the name BookDataStyle. This style can then be repeatedly applied by a ListBox control whose collection is bound to the BookData data source. The ListBox's ItemStyle attribute is how the item style is specified to the ListBox.

```
class System.Windows.Data.XmlDataSource : Object Implements:
IDataSource IParseLiteralContent
{
public virtual sealed Object get_Data( )
public XmlDocument get_Document( )
public String get_Source( )
public XmlNamespaceManager get_XmlNamespaceManager( )
public String get_XPath( )
public virtual Void Parse(TextReader textReader,
ParserContext parserContext)
public virtual sealed Void Refresh( )
public Void set_Document(XmlDocument value)
public Void set_Source(String value)
public Void set_XmlNamespaceManager(XmlNamespaceManager value)
public Void set_XPath(String value)
}
```

Declares an individual namespace within an Extensible Markup Language (XML) data source.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

XmlNamespace—Initializes a new instance of the XmlNamespace class.

Property Description

Prefix—Gets or sets the prefix to use for this namespace.

Uri—Gets or sets the Uniform Resource Identifier (URI) for this namespace.

```
class System.Windows.Data.XmlNamespace : Object
{
public String get_Prefix( )
public String get_Uri( )
public Void set_Prefix(String value)
public Void set_Uri(String value)
}
```

The delegate to use for handlers that receive the DataContextChanged event.

```
class sealed System.Windows.DataContextChangedEventHandler :
MulticastDelegate : Delegate : Object Implements: ICloneable
ISerializable
{
public virtual IAsyncResult BeginInvoke(Object sender, EventArgs args,
AsyncCallback callback, Object object)
public virtual Void EndInvoke(IAsyncResult result)
public virtual Void Invoke(Object sender, EventArgs args)
}
```

Method Description

AddHandler—Add an instance handler for the given RoutedEventID Inherited from ContentElement.

AddToEventRoute—Adds handlers for the current instance to the route Inherited from ContentElement.

BuildRoute—Builds the event route Inherited from ContentElement.

CaptureMouse—Captures the mouse to this element. Inherited from ContentElement.

ClearAllBindings—Removes all bindings attached to an element.

ClearBinding—Removes the binding attached to the specified DependencyProperty.

ClearValue—Clears the local value of a property Inherited from DependencyObject.

DeferLoad—This purpose of this method as the name indicates is to defer the firing of the Loaded event EndDeferLoad—This call is meant to match a prior DeferLoad call, thereby cause Loaded event to be fired if there are no more pending EndDeferLoad calls.

Equals—Determines whether two Object instances are equal. Inherited from Object.

Finalize—Allows an Object to attempt to free resources and perform other cleanup operations before the Object is reclaimed by garbage collection. Inherited from Object.

FindResource—Searches for a resource with the passed name and returns it

Focus—Focuses the keyboard on this element. Inherited from ContentElement.

FrameworkContentElement—Create an instance of a FrameworkContentElement

GetAnimationBaseValue—If the dependency property is animated this method will give you the value as if it was not animated. Inherited from ContentElement.

GetAnimations—Retrieves an animation collection associated with a DependencyID on this element. Inherited from ContentElement.

GetBinding—Returns the Binding for the specified property.

GetHashCode—Serves as a hash function for a particular type, suitable for use in hashing algorithms and data structures like a hash table. Inherited from Object.

GetLocalValueEnumerator—Create a local value enumerator for this instance Inherited from DependencyObject.

GetRoutedEventIDs—Get RoutedEventIDs with handlers Inherited from ContentElement.

GetType—Gets the Type of the current instance. Inherited from Object.

GetValue—Retrieve the value of a property Inherited from DependencyObject.

ILogicalTreeNode.OnNewParent

ILogicalTreeNode.OnParentChanged

InvalidateProperty—Invalidates a property Inherited from DependencyObject.

MemberwiseClone—Creates a shallow copy of the current Object. Inherited from Object.

OnDelayedInvalidate—Inherited from DependencyObject during build.

OnGotFocus—An event announcing that the keyboard is focused on this element. Inherited from ContentElement.

OnGotMouseCapture—An event reporting that this element got the mouse capture. Inherited from ContentElement.

OnIsFocusedChanged—An event reporting that the IsFocused property has changed.

OnIsFocusWithinChanged—An event reporting that the IsFocusWithin property changed.

OnIsMouseCapturedChanged—An event reporting that the IsMouseCaptured property changed. Inherited from ContentElement.

OnIsMouseDirectlyOverChanged—An event reporting that the IsMouseDirectlyOver property has changed.

OnIsMouseOverChanged—An event reporting that the IsMouseOver property changed.

OnKeyDown—An event reporting a key was pressed. Inherited from ContentElement.

OnKeyUp—An event reporting a key was released. Inherited from ContentElement.

OnLostFocus—An event announcing that the keyboard is no longer focused Inherited from ContentElement.

OnLostMouseCapture—An event reporting that this element lost the mouse capture. Inherited from ContentElement.

OnMouseEnter—An event reporting the mouse entered this element. Inherited from ContentElement.

OnMouseLeave—An event reporting the mouse left this element. Inherited from ContentElement.

OnMouseLeftButtonDown—An event reporting the left mouse button was pressed. Inherited from ContentElement.

OnMouseLeftButtonUp—An event reporting the left mouse button was released. Inherited from ContentElement.

OnMouseMove—An event reporting a mouse move. Inherited from ContentElement.

OnMouseRightButtonDown—An event reporting the right mouse button was pressed. Inherited from ContentElement.

OnMouseRightButtonUp—An event reporting the right mouse button was released. Inherited from ContentElement.

OnMouseWheel—An event reporting a mouse wheel rotation. Inherited from ContentElement.

OnNewParent—Sets input parent to given new value Inherited from ContentElement.

OnPreviewGotFocus—An event announcing that the keyboard is focused on this element. Inherited from ContentElement.

OnPreviewKeyDown—An event reporting a key was pressed. Inherited from ContentElement.

OnPreviewKeyUp—An event reporting a key was released. Inherited from ContentElement.

OnPreviewLostFocus—An event announcing that the keyboard is no longer focused Inherited from ContentElement.

OnPreviewMouseEnter—When the mouse enters an element, set the cursor. We do this in a class handler, rather than overriding OnIsMouseDirectlyOverChanged, because that is a virtual which can be overridden and not called.

OnPreviewMouseLeave—An event reporting the mouse left this element. Inherited from ContentElement.

OnPreviewMouseLeftButtonDown—An event reporting the left mouse button was pressed. Inherited from Content Element.

OnPreviewMouseLeftButtonUp—An event reporting the left mouse button was released. Inherited from ContentElement.

OnPreviewMouseMove—An event reporting a mouse move. Inherited from ContentElement.

OnPreviewMouseRightBuftonDown—An event reporting the right mouse button was pressed. Inherited from Content Element.

OnPreviewMouseRightButtonUp—An event reporting the right mouse button was released. Inherited from Content Element.

OnPreviewMouseWheel—An event reporting a mouse wheel rotation. Inherited from ContentElement.

OnPreviewTextInput—An event announcing some text input. Inherited from ContentElement.

OnPropertyInvalidated—Notification that a specified property has been invalidated OnStyleChanged OnTextInput—An event announcing some text input. Inherited from ContentElement.

RaiseEvent—Raise routed event with the given args Inherited from ContentElement.

ReadLocalValue—Retrieve the local value of a property (if set) Inherited from DependencyObject.

ReferenceEquals—Determines whether the specified Object instances are the same instance. Inherited from Object.

ReleaseMouseCapture—Releases the mouse capture. Inherited from ContentElement.

RemoveHandler—Remove all instances of the given handler for the given RoutedEventID Inherited from ContentElement.

SetAnimations—Associates an AnimationCollection with a DependencyID on this element. Inherited from ContentElement.

SetBinding—Attaches a binding.

SetContext—Associates this UIContextObject with a UIContext. Inherited from UIContextObject.

SetResourceReference—Searches for a resource called name and sets up a resource reference to it for the passed property.

SetValue—Sets the local value of a property Inherited from DependencyObject.

ToString—Returns a String that represents the current Object. Inherited from Object.

ValidateProperty—Retrieve the value of a property (for use by native cache backed custom get accessors) Inherited from DependencyObject.

ValidatePropertyCore—Allows subclasses to participate in property value computation

```
      class    System.Windows.FrameworkContentElement    :
ContentElement : DependencyObject : UIContextObject :
Object Implements: IInputElement IFrameworkInputElement
ILogicalTreeNode ILoaded
{
    public Void ClearAllBindings( )
    public Void ClearBinding(DependencyProperty dp)
    public Object get_DataContext( )
    public Binding GetBinding(DependencyProperty dp)
    public Void set_DataContext(Object value)
    public Binding SetBinding(DependencyProperty dp, Bind bind)
    public Binding SetBinding(DependencyProperty dp, String path)
    public Binding SetBinding(DependencyProperty dp, String path,
BindType bindType)
    public Binding SetBinding(DependencyProperty dp, String path,
BindType bindType, ObjectRef source)
    public Binding SetBinding(DependencyProperty dp, String path,
BindType bindType, ObjectRef source, UpdateType updateType)
    public Binding SetBinding(DependencyProperty dp, String path,
BindType bindType, ObjectRef source, UpdateType updateType,
IDataTransformer transformer)
    public Binding SetBinding(DependencyProperty dp, String path,
BindType bindType, ObjectRef source, UpdateType updateType,
IDataTransformer transformer, CultureInfo culture)
    public Binding SetBinding(DependencyProperty dp, String path,
BindType bindType, ObjectRef source, UpdateType updateType,
IDataTransformer transformer, CultureInfo culture, BindFlags bindFlags)
    public static readonlyDependencyProperty DataContextProperty
}
```

The base object for the Frameworks

Event Attribute Description

DataContextChanged—DataContextChanged event

GotFocus—An event announcing that the keyboard is focused on this element. Inherited from UIElement.

GotMouseCapture—An event reporting that this element got the mouse capture. Inherited from UIElement.

IsFocusedChanged—An event reporting that the IsFocused property changed. Inherited from UIElement.

IsFocusWithinChanged—An event reporting that the IsFocusWithin property changed.

IsMouseCapturedChanged—An event reporting that the IsMouseCaptured property changed. Inherited from UIElement.

IsMouseDirectlyOverChanged—An event reporting that the IsMouseDirectlyOver property changed. Inherited from UIElement.

IsMouseOverChanged—An event reporting that the IsMouseOver property changed.

KeyDown—An event reporting a key was pressed. Inherited from UIElement.

KeyUp—An event reporting a key was released. Inherited from UIElement.

Loaded—This clr event is fired when IsLoaded becomes true

LostFocus—An event announcing that the keyboard is no longer focused on this element. Inherited from UIElement.

LostMouseCapture—An event reporting that this element lost the mouse capture. Inherited from UIElement.

MouseEnter—An event reporting the mouse entered this element. Inherited from UIElement.

MouseHover—An event reporting a mouse hover.

MouseLeave—An event reporting the mouse left this element. Inherited from UIElement.

MouseLeftButtonDown—An event reporting the left mouse button was pressed. Inherited from UIElement.

MouseLeftButtonUp—An event reporting the left mouse button was released. Inherited from UIElement.

MouseMove—An event reporting a mouse move. Inherited from UIElement.

MouseRightButtonDown—An event reporting the right mouse button was pressed. Inherited from UIElement.

MouseRightButtonUp—An event reporting the right mouse button was released. Inherited from UIElement.

MouseWheel—An event reporting a mouse wheel rotation. Inherited from UIElement.

PreviewGotFocus—An event announcing that the keyboard is focused on this element. Inherited from UIElement.

PreviewKeyDown—An event reporting a key was pressed. Inherited from UIElement.

PreviewKeyUp—An event reporting a key was released. Inherited from UIElement.

PreviewLostFocus—An event announcing that the keyboard is no longer focused on this element. Inherited from UIElement.

PreviewMouseEnter—An event reporting the mouse entered this element. Inherited from UIElement.

PreviewMouseHover—An event reporting a mouse hover.

PreviewMouseLeave—An event reporting the mouse left this element. Inherited from UIElement.

PreviewMouseLeftButtonDown—An event reporting the left mouse button was pressed. Inherited from UIElement.

PreviewMouseLeftButtonUp—An event reporting the left mouse button was released. Inherited from UIElement.

PreviewMouseMove—An event reporting a mouse move. Inherited from UIElement.

PreviewMouseRightButtonDown—An event reporting the right mouse button was pressed. Inherited from UIElement.

PreviewMouseRightButtonUp—An event reporting the right mouse button was released. Inherited from UIElement.

PreviewMouseWheel—An event reporting a mouse wheel rotation. Inherited from UIElement.

PreviewTextInput—An event announcing some text input. Inherited from UIElement.

TextInput—An event announcing some text input. Inherited from UIElement.

Field Description

AnimationEffectsProperty—Timeline property. Inherited from UIElement.

ClipProperty—Clip Property Inherited from UIElement.

ClipToBoundsProperty—ClipToBounds Property Inherited from UIElement.

CursorProperty—CursorProperty

DataContextProperty—DataContext DependencyProperty

FlowDirectionProperty—FlowDirectionProperty

FocusableProperty—The dependency ID for the Focusable property.

HeightProperty—HeightProperty

IDProperty—The dependency ID for the ID property.

IsEnabledProperty—The dependency ID for the IsEnabled property.

IsFocusedProperty—The dependency property for the IsFocused property. Inherited from UIElement.

IsFocusWithinProperty—The dependency property for the IsFocusWithin property.

IsMouseCapturedProperty—The dependency property for the IsMouseCaptured property. Inherited from UIElement.

IsMouseDirectlyOverProperty—The dependency property for the IsMouseDirectlyOver property. Inherited from UIElement.

IsMouseOverProperty—The dependency property for the IsMouseOver property.

MarginProperty—MarginProperty

MaxHeightProperty—MaxHeight Property

MaxWidthProperty—MaxWidth Property

MinHeightProperty—MinHeight Property

MinWidthProperty—MinWidth Property

OpacityProperty—The Opacity property. Inherited from UIElement.

StyleProperty—Style Dependency Property

TimelineProperty—Timeline property. Inherited from UIElement.

VisibilityProperty—The Visibility property. Inherited from UIElement.

WidthProperty—Width Property

Method Description

AddHandler—See overloaded method for details Inherited from UIElement.

AdjustEventSource—Allows adjustment to the event source Inherited from UIElement.

Arrange—Parents or system call this method to arrange the internals of children on a second pass of layout update. Inherited from UIElement.

ArrangeChildHelper—The helper method for a parent to call instead of Arrange on a child during layout. Reads Width, Height, Min/MaxWidth, Min/MaxHeight from the child, uses reference size to resolve percent values and calls Arrange method on a child with modified arrangeSize.

ArrangeCore—ArrangeCore allows for the customization of the positioning of children. Inherited from UIElement.

BuildRoute—Builds the EventRoute Inherited from UIElement.

BuildRouteCore—Allows FrameworkElement to augment the EventRoute

CaptureMouse—Captures the mouse to this element. Inherited from UIElement.

ClearAllBindings—Removes all bindings attached to the element.

ClearBinding—Removes the binding attached to the specified DependencyProperty.

ClearValue—Clears the local value of a property Inherited from DependencyObject.

DeferLoad—This purpose of this method as the name indicates is to defer the firing of the Loaded event EndDeferLoad—This call is meant to match a prior DeferLoad call, thereby cause Loaded event to be fired if there are no more pending EndDeferLoad calls.

EnsureVisuals—Build the current Style's VisualTree

Equals—Determines whether two Object instances are equal. Inherited from Object.

Finalize—Releases all resources held by the Visual object. Inherited from Visual.

FindResource—Searches for a resource with the passed name and returns it

Focus—Focuses the keyboard on this element. Inherited from UIElement.

FrameworkElement—Default DependencyObject constructor

GetAnimationBaseValue—If the dependency property is animated this method will give you the value as if it was not animated. Inherited from UIElement.

GetAnimations—Retrieves an animation collection associated with a DependencyID on this element. Inherited from UIElement.

GetAutomationProvider—Called by the Automation infrastructure to request a provider object to provide additional properties for this element.

GetBinding—Returns the Binding for the specified property.

GetHashCode—Serves as a hash function for a particular type, suitable for use in hashing algorithms and data structures like a hash table. Inherited from Object.

GetLocalValueEnumerator—Create a local value enumerator for this instance Inherited from DependencyObject.

GetRoutedEventIDs—Get RoutedEventIDs with handlers Inherited from UIElement.

GetType—Gets the Type of the current instance. Inherited from Object.

GetValue—Retrieve the value of a property Inherited from DependencyObject.

HitTestCore—HitTestCore implements precise hit testing against render contents Inherited from RetainedVisual.

IDragDrop.OnDragEnter

IDragDrop.OnDragLeave

IDragDrop.OnDragOver

IDragDrop.OnDrop

IDragDrop.OnGiveFeedback

IDragDrop.OnQueryContinueDrag

ILogicalTreeNode.OnNewParent

ILogicalTreeNode.OnParentChanged

InvalidateArrange—Invalidates the arrange state for the element. The element will be queued for an update layout that will occur asynchronously. MeasureCore will not be called unless InvalidateMeasure is also called—or that something else caused the measure state to be invalidated. Inherited from UIElement.

InvalidateMeasure—Invalidates the measurement state for the element. This has the effect of also invalidating the arrange state for the element. The element will be queued for an update layout that will occur asynchronously. Inherited from UIElement.

InvalidateProperty—Invalidates a property Inherited from DependencyObject.

InvalidateVisual—InvalidateVisual. Inherited from RetainedVisual.

IRetainedRender.Render—Inherited from UIElement.

IVisual.FindCommonVisualAncestor—Inherited from Visual.

IVisual.HitTest—Inherited from Visual.

IVisual.IsAncestorOf—Inherited from Visual.

IVisual.IsDescendantOf—Inherited from Visual.

IVisual.TransformFromAncestor—Inherited from Visual.

IVisual.TransformFromDescendant—Inherited from Visual.

IVisual.TransformFromVisual—Inherited from Visual.

IVisual.TransformToAncestor—Inherited from Visual.

IVisual.TransformToDescendant—Inherited from Visual.

IVisual.TransformToVisual—Inherited from Visual.

Measure Updates DesiredSize of the UIElement. Must typically be called by parents from theor MeasureCore, to form recursive update. This is first pass of layout update. Inherited from UIElement.

MeasureChildHelper The helper method for a parent to call instead of Measure on a child during layout. Reads Width, Height, Min/MaxWidth, Min/MaxHeight from the child, uses reference size to resolve percent values and calls Measure method on a child with correct constraint. Aslo 'clamps' child's desired size using specified sizing properties.

MeasureCore Measurement override. Implement your size-to-content logic here. Inherited from UIElement.

MemberwiseClone Creates a shallow copy of the current Object. Inherited from Object.

OnAccessKey The access key for this element was invoked. Base implementation sets focus to the element. Inherited from UIElement.

OnChildDesiredSizeChanged Notification that is called by Measure of a child when it ends up with different desired size for the child. Inherited from UIElement.

OnDelayedInvalidate Inherited from DependencyObject in build.

OnGotFocus An event announcing that the keyboard is focused on this element. Inherited from UIElement.

OnGotMouseCapture An event reporting that this element got the mouse capture. Inherited from UIElement.

OnIsFocusedChanged An event reporting that the IsFocused property has changed.

OnIsFocusWithinChanged An event reporting that the IsFocusWithin property changed.

OnIsMouseCapturedChanged An event reporting that the IsMouseCaptured property changed. Inherited from UIElement.

OnIsMouseDirectlyOverChanged An event reporting that the IsMouseDirectlyOver property has changed.

OnIsMouseOverChanged An event reporting that the IsMouseOver property changed.

OnKeyDown An event reporting a key was pressed. Inherited from UIElement.

OnKeyUp An event reporting a key was released. Inherited from UIElement.

OnLostFocus An event announcing that the keyboard is no longer focused Inherited from UIElement.

OnLostMouseCapture An event reporting that this element lost the mouse capture. Inherited from UIElement.

OnMouseEnter An event reporting the mouse entered this element. Inherited from UIElement.

OnMouseLeave An event reporting the mouse left this element. Inherited from UIElement.

OnMouseLeftButtonDown An event reporting the left mouse button was pressed. Inherited from UIElement.

OnMouseLeftButtonUp An event reporting the left mouse button was released. Inherited from UIElement.

OnMouseMove An event reporting a mouse move. Inherited from UIElement.

OnMouseRightButtonDown An event reporting the right mouse button was pressed. Inherited from UIElement.

OnMouseRightButtonUp An event reporting the right mouse button was released. Inherited from UIElement.

OnMouseWheel An event reporting a mouse wheel rotation. Inherited from UIElement.

OnPreviewGotFocus An event announcing that the keyboard is focused on this element. Inherited from UIElement.

OnPreviewKeyDown An event reporting a key was pressed. Inherited from UIElement.

OnPreviewKeyUp An event reporting a key was released. Inherited from UIElement.

OnPreviewLostFocus An event announcing that the keyboard is no longer focused Inherited from UIElement.

OnPreviewMouseEnter When the mouse enters an element, set the cursor. We do this in a class handler, rather than overriding OnIsMouseDirectlyOverChanged, because that is a virtual which can be overridden and not called.

OnPreviewMouseLeave An event reporting the mouse left this element. Inherited from UIElement.

OnPreviewMouseLeftButtonDown An event reporting the left mouse button was pressed. Inherited from UIElement.

OnPreviewMouseLeftButtonUp An event reporting the left mouse button was released. Inherited from UIElement.

OnPreviewMouseMove An event reporting a mouse move. Inherited from UIElement.

OnPreviewMouseRightButtonDown An event reporting the right mouse button was pressed. Inherited from UIElement.

OnPreviewMouseRightButtonUp An event reporting the right mouse button was released. Inherited from UIElement.

OnPreviewMouseWheel An event reporting a mouse wheel rotation. Inherited from UIElement.

OnPreviewTextInput An event announcing some text input. Inherited from UIElement.

OnPropertyInvalidated Notification that a specified property has been invalidated OnRender Render callback. Inherited from UIElement.

OnStyleChanged Style has changed

OnTextInput An event announcing some text input. Inherited from UIElement.

RaiseCommand RaiseCommand Inherited from UIElement.

RaiseEvent Raise the events specified by RoutedEventID Inherited from UIElement.

RaiseQueryStatus RaiseQueryStatus Inherited from UIElement.

ReadLocalValue Retrieve the local value of a property (if set) Inherited from DependencyObject.

ReferenceEquals Determines whether the specified Object instances are the same instance. Inherited from Object.

ReleaseMouseCapture Releases the mouse capture. Inherited from UIElement.

RemoveHandler Removes all instances of the specified routed event handler for this object instance Inherited from UIElement.

RenderOpen RendeOpen opens the RetainedVisual for rendering. Inherited from RetainedVisual.

SetAnimations Associates an AnimationCollection with a DependencyID on this element. Inherited from UIElement.

SetBinding Attaches a binding.

SetContext Associates this UIContextObject with a UIContext. Inherited from UIContextObject.

SetResourceReference Searches for a resource called name and sets up a resource reference to it for the passed property.

SetValue Sets the local value of a property Inherited from DependencyObject.

ToString Returns a String that represents the current Object. Inherited from Object.

TraverseFocus Request to move the focus from this element to another element

UpdateLayout Call this method to ensure that the wheel subtree of elements that includes this UIElement is properly updated. Inherited from UIElement.

ValidateProperty Retrieve the value of a property (for use by native cache backed custom get accessors) Inherited from DependencyObject.

ValidatePropertyCore Allows subclasses to participate in property value computation Property Attribute Description AnimationEffects—The collection of AnimationEffect attached to this element. Inherited from UIElement.

Clip—Clip Property Inherited from UIElement.

ClipToBounds—ClipToBounds Property Inherited from UIElement.

CommandLinks—CommandLinks Inherited from UIElement.

ComputedSize—Returns the actual size of the element. Inherited from UIElement.

ContentOwner—ContentOwner is the ItemsControl whose items produce the content for the current element. This property can only be set in the chrome template for an Items Control—it identifies the location in the template where the ItemsControl should place the UI generated for its items.

Context—Returns the UIContext that this UIContextObject is associated with. Inherited from UIContextObject.

Cursor—Cursor Property

DataContext—Gets or sets the data context for an element.

DependencyObjectType—Returns the DType that represents the CLR type of this instance Inherited from DependencyObject.

DesiredSize—Returns the size the element computed during the Measure pass. This is only valid if IsMeasureValid is true. Inherited from UIElement.

FlowDirection—FlowDirection Property

Focusable—Gettor and Settor for Focusable Property

ForwardCommandsTo—CommandLinks Inherited from UIElement.

HasAnimations—Determines if any animations are present on this element Inherited from UIElement.

Height—Gets or sets the height of the element.

HitTestBounds—HitBounds returns the hit region bounding box for the current visual. Inherited from Visual.

ID—ID property.

IsArrangeValid—Determines if the ComputedSize and position of child elements is valid. Inherited from UIElement.

IsDisposed—Gets a value that indicates whether the system has disposed of the Visual. Inherited from Visual.

IsEnabled—A property indicating if this element is enabled or not.

IsFocused—A property indicating if the keyboard is focused on this element or not. Inherited from UIElement.

IsFocusWithin—Indicates if Keyboard Focus is anywhere within in the subtree starting at the current instance IsLoaded—Read-only property that tells you if or not the current element has been loaded IsMeasureValid—Determines if the DesiredSize is valid. Inherited from UIElement.

IsMouseCaptured—A property indicating if the mouse is captured to this element or not. Inherited from UIElement.

IsMouseDirectlyOver—A property indicating if the mouse is over this element or not. Inherited from UIElement.

IsMouseOver—A property indicating if the mouse is over this element or not.

IsRequestingAnimationBaseValue—This property will return true while the class is calculating the animation base value requested by a call to GetAnimationBaseValue( ). Inherited from UIElement.

IsTreeSeparator—Indicates if the current instance is at the root of a separate tree KeyboardActive—Gettor and Settor for KeyboardActive Property Margin—Margin Property MaxHeight—MaxHeight Property MaxWidth—MaxWidth Property MinHeight—MinHeight Property MinWidth—MinWidth Property Opacity—Opacity accessor Inherited from UIElement.

Parent—Returns logical parent

RenderBounds—This property is only used if the RetainedVisual implements RetainedRender. If not this property will throw an InvalidOperationException. The implementer must typically set this property to the bounds of the ink drawn by his Render function in local coordinate space. Inherited from RetainedVisual.

Resources—Current locally defined Resources

Style—Style property

Timeline—Timeline accessor. Inherited from UIElement.

Visibility—Visibility accessor Inherited from UIElement.

Width—Gets or sets the width of the element.

```
class System.Windows.FrameworkElement : UIElement :
RetainedVisual : Visual : DependencyObject : UIContextObject : Object
    Implements: IVisual IRetainedRender IInputElement ICommandTarget
IFrameworkInputElement ILogicalTreeNode IDragDrop ILoaded
    {
    public Void ClearAllBindings( )
    public Void ClearBinding(DependencyProperty dp)
    public Object get_DataContext( )
    public Binding GetBinding(DependencyProperty dp)
    public Void set_DataContext(Object value)
    public Binding SetBinding(DependencyProperty dp, Bind bind)
    public Binding SetBinding(DependencyProperty dp, String path)
    public Binding SetBinding(DependencyProperty dp, String path, BindType
bindType)
    public Binding SetBinding(DependencyProperty dp, String path, BindType
bindType, ObjectRef source)
    public Binding SetBinding(DependencyProperty dp, String path, BindType
bindType, ObjectRef source, UpdateType updateType)
    public Binding SetBinding(DependencyProperty dp, String path, BindType
bindType, ObjectRef source, UpdateType updateType, IDataTransformer
transformer)
    public Binding SetBinding(DependencyProperty dp, String path, BindType
bindType, ObjectRef source, UpdateType updateType, IDataTransformer
transformer, CultureInfo culture)
```

-continued

```
        public Binding SetBinding(DependencyProperty dp, String path, BindType
bindType, ObjectRef source, UpdateType updateType, IDataTransformer
transformer, CultureInfo culture, BindFlags bindFlags)
        public static readonlyDependencyProperty DataContextProperty
}
```

Templating Instance Representation
Method Description
AliasProperty—Set up a binding between a template child and the styled container
AppendChild—Add a factory child to this factory
CreateInstance—Create an instance of the specified type
Equals—Determines whether two Object instances are equal. Inherited from Object.
Finalize—Allows an Object to attempt to free resources and perform other cleanup operations before the Object is reclaimed by garbage collection. Inherited from Object.
FrameworkElementFactory—Construction
GetHashCode—Serves as a hash function for a particular type, suitable for use in hashing algorithms and data structures like a hash table. Inherited from Object.
GetType—Gets the Type of the current instance. Inherited from Object.
MemberwiseClone—Creates a shallow copy of the current Object. Inherited from Object.
ReferenceEquals—Determines whether the specified Object instances are the same instance. Inherited from Object.
SetBinding—Creates an initial binding in the factory's template children.
SetValue—Simple value set on template child
ToString—Returns a String that represents the current Object. Inherited from Object.
Property Description
FirstChild—First child factory
IsSealed—FrameworkElementFactory mutability state
NextSibling—Next sibling factory
Parent—Parent factory
StyleID—Style identifier
Type—Type of object that the factory will produce

```
        class   System.Windows.FrameworkElementFactory   :   Object
{
public Void SetBinding(DependencyProperty dp, Bind bind)
}
        class     System.Windows.FrameworkPropertyMetadata    :
PropertyMetadata : Object
{
public Boolean get_Databindable( )
public Void set_Databindable(Boolean value)
}
        enum sealed System.Windows.MetadataFlags : Enum :
        ValueType :
Object Implements: IComparable IFormattable IConvertible
{
public static MetadataFlags NoDatabind
}
        abstract    interface    System.Windows.IApplyValue
{
public virtual Void Apply(DependencyObject e, DependencyProperty dp)
}
```

An abstract class, used as the base class for several other provided "Avalon" classes that manage a view of a data collection.

CollectionChanged—Occurs when the collection view changes. This could mean that items were added or removed in the collection, or that a new sort or filter was applied to this view.
ProtectedCurrentChanged—A protected event. In derived classes, this event occurs after changing the position of the record pointer.
ProtectedCurrentChanging—A protected event. In derived classes, this event occurs before a change in currency. If necessary, handlers of the event can cancel the change.
Method Description
ChangedCurrent—Raises the implemented CurrentChanged event of the object.
CollectionView—Initializes a new instance of a CollectionView derived class. This constructor is protected in the base CollectionView class.
Contains—Determines whether a given data item belongs to this collection view.
ContainsItem—Determines whether a given data item belongs to this collection view or the unfiltered collection.
Equals—Determines whether two Object instances are equal. Inherited from Object.
Finalize—Allows an Object to attempt to free resources and perform other cleanup operations before the Object is reclaimed by garbage collection. Inherited from Object.
GetEnumerator—Returns an enumerator that can iterate through the collection view.
GetHashCode—Serves as a hash function for a particular type, suitable for use in hashing algorithms and data structures like a hash table. Inherited from Object.
GetType—Gets the Type of the current instance. Inherited from Object.
IndexOf—Returns the index where the given data item belongs in the collection, or −1 if the index of that item is unknown.
MemberwiseClone—Creates a shallow copy of the current Object. Inherited from Object.
OKToChangeCurrent—Determines whether it is allowable to change the position of the current record pointer.
OnCollectionChanged—Implement this method to handle CollectionChanged events in the data collection that underlies the collection view.
ReferenceEquals—Determines whether the specified Object instances are the same instance. Inherited from Object.
Refresh—Refreshes the view. Reapplies any current sort or filter conditions, as set by various properties that declare sort or filter criteria.
ToString—Returns a String that represents the current Object. Inherited from Object.

```
        abstract  class  System.ComponentModel.CollectionView : Object
Implements: IEnumerable ICollectionChange
{
protected Void ChangedCurrent( )
public virtual Boolean Contains(Object item)
```

-continued

```
public virtual Boolean ContainsItem(Object item)
public virtual Boolean get_CanFilter( )
public virtual Boolean get_CanSort( )
public ICollection get_Collection( )
public virtual IComparer get_Comparer( )
public virtual Int32 get_Count( )
public virtual ICurrentItem get_CurrentItem( )
public virtual String get_Filter( )
public virtual SortDescription[ ] get_Sort( )
public Object get_ViewManagerData( )
public virtual IEnumerator GetEnumerator( )
public virtual Int32 IndexOf(Object item)
protected Boolean OKToChangeCurrent( )
protected    virtual    Void    OnCollectionChanged(Object
sender,
CollectionChangeEventArgs args)
public virtual Void Refresh( )
public virtual Void set_Filter(String value)
public virtual Void set_Sort(SortDescription[ ] value)
public Void set_ViewManagerData(Object value)
}
```

Represents the method that handles the CurrentChanged event raised by collection views, or any class implementing the ICurrentItem interface.

Parameters sender System.Object. View that is proposing to change current item.

args System.EventArgs. Event arguments.

Return Value System.Void.

```
            class                              sealed
System.ComponentModel.CurrentChangedEventHandler   :
MulticastDelegate    :
Delegate : Object Implements: ICloneable ISerializable
{
public    virtual    IAsyncResult    BeginInvoke(Object
sender,   EventArgs   args,
AsyncCallback callback, Object object)
public virtual Void EndInvoke(IAsyncResult result)
public virtual Void Invoke(Object sender, EventArgs args)
}
```

Represents the method that handles the CurrentChanging event raised by collection view classes, or any class implementing the ICurrentItem interface.

Parameters sender—System.Object. The collection view Object that is changing currency. This will be an instance of CollectionView a derived class, or a class implementing ICurrentItem.

args—System.ComponentModel.CancelEventArgs.
Arguments of the event, as an instance of CancelEventArgs.

Return Value System.Void.

This event is invoked immediately before the current record pointer moves in this view. The Cancel property in the event arguments can be used to cancel the proposed move, and this convention should be respected by the currency logic in custom collection views. See ProtectedCurrentChanging for an example.

CollectionView is an abstract class. The event might be more properly understood by looking at actual derivations of the class, such as ListCollectionView and ArrayListCollectionView. In these classes the event does not include the "Protected" prefix.

```
            class                              sealed
System.ComponentModel.CurrentChangingEventHandler   :
MulticastDelegate    :
Delegate : Object Implements: ICloneable ISerializable
{
public virtual IAsyncResult BeginInvoke(Object sender, CancelEventArgs
args,
AsyncCallback callback, Object object)
public virtual Void EndInvoke(IAsyncResult result)
public virtual Void Invoke(Object sender, CancelEventArgs args)
}
```

Enables notifications that items within a collection have changed: an item has been added, removed, or the entire collection has been refreshed.

Event Description

CollectionChanged—Occurs if the collection has changed its content. Arguments of the event specify the change that has taken place.

This interface is implemented by the ArrayListDataCollection data collection class.

```
abstract interface System.ComponentModel.ICollectionChange
{
}
```

An interface used to create collection view factory classes, which in turn create new CollectionView derived objects.

Method Description

CreateView—Creates a new view on the collection that implements this interface. Normally, this method is only called by a view manager, not by user code.

Normally, user code does not call methods on this interface. The common way to obtain a view over a collection is to call GetView.

```
abstract interface System.ComponentModel.ICollectionViewFactory
{
public virtual CollectionView CreateView( )
}
```

Maintains the concept of the current record pointer in a collection view.

Event Description

CurrentChanged—Occurs immediately after changing the position of the current record pointer within the collection view.

CurrentChanging—Occurs immediately before changing the position of the current record pointer within the collection view. Handlers to the event should have the opportunity to cancel the position move by using the Cancel property of the returned arguments class to cancel the move.

Method Description

MoveFirst—Moves the record pointer to the first record in the collection view.

MoveLast—Moves the record pointer to the last record in the collection view.

MoveNext—Moves the record pointer to the next record in the collection view.

MovePrevious—Moves the record pointer to the previous record in the collection view.

MoveTo—Moves the record pointer to the specified record in the collection view.

Property Description

BOF—Gets the Boolean value that declares whether the record pointer is at or before the beginning of the collection array.

Current—Gets the current record located at the current record pointer position.

EOF—Gets a Boolean value that declares whether the record pointer is at or beyond the end of the collection array.

Remarks

ArrayListCollectionView implements this interface indirectly, as do several other provided collection view classes.

To access methods of ICurrentItem in collection views, get the CurrentItem object in the view. This object supports ICurrentItem and thus enables changing the current record position.

By choosing to not implement this interface, very simple collection views can choose not to support currency, but this is not recommended.

How do I Navigate Through the Objects in a Data Collection View?

You can navigate through the objects in a data collection view by using the methods provided in view classes that inherit the ICurrentItem interface. Although the methods and properties involved are not direct members of the view classes, you can call these methods by returning the CurrentItem object and calling the various ICurrentItem collection navigation methods on it. In most cases, implementations of collection views derive from CollectionView and inherit from ICurrentItem. There are several methods defined by ICurrentItem that are used for navigating the objects in the collection.

MoveFirst
MoveLast
MoveNext
MovePrevious
MoveTo

MoveFirst and MoveLast take you to the first or last objects in the collection, respectively. MoveNext and MovePrevious take you to the next or previous objects in the collection, relative to the Current object. MoveTo accepts an object argument and moves the current record pointer to that object's record if it could be found. In addition to attempting the desired move, these methods return Boolean values that inform you whether the record pointer is now on an item that exists in the current view (this distinction comes into play if you are viewing a collection with a filter applied).

In this C# example, the same function handles button clicks from either a Previous or Next button. MyCollectionView is a view that is an instance of CollectionView. This is the base view class that implements the ICurrentItem interface. Most common view operations can be handled with this base class, rather than choosing to cast the initially returned view to the more specialized view classes ListCollectionView, BindingListCollectionView, or ArrayListCollectionView.

```
public void OnButton(Object sender, ClickEventArgs args)
{
Button b = sender as Button;
switch(b.ID)
{
case "Previous":
MyCollectionView.CurrentItem.MovePrevious( );
if(!MyCollectionView.CurrentItem.BOF)
{
FeedbackText.Text = "";
o = MyCollectionView.CurrentItem.Current as Order;
myListBox.SelectedIndex = MyCollectionView.IndexOf(o);
}
```

-continued

```
}
else
{
MyCollectionView.CurrentItem.MoveFirst( );
FeedbackText.Text = "At first record";
}
    break;
    case "Next":
    MyCollectionView.CurrentItem.MoveNext( );
    if(!MyCollectionView.CurrentItem.EOF)
    {
    FeedbackText.Text = "";
    o = MyCollectionView.CurrentItem.Current as Order;
    myListBox.SelectedIndex = MyCollectionView.IndexOf(o);
    }
    else
    {
    MyCollectionView.CurrentItem.MoveLast( );
    FeedbackText.Text = "At last record";
    }
    break;
    }
    }
        abstract interface System.ComponentModel.ICurrentItem
{
public virtual Boolean get_BOF( )
public virtual Object get_Current( )
public virtual Boolean get_EOF( )
public virtual Boolean MoveFirst( )
public virtual Boolean MoveLast( )
public virtual Boolean MoveNext( )
public virtual Boolean MovePrevious( )
public virtual Boolean MoveTo(Object item)
}
```

Create a One-Way Binding to a Dynamically Updated Data Source

Classes that implement this interface can update the bound target property whenever the source property changes.

Event Description

PropertyChanged—Occurs whenever a property of a data item class changes.

Events

How do I Implement Property Change Notification?

This example shows how to provide for property change notification in your data items by implementing the IPropertyChange interface.

You can bind user interface (UI) presentation elements to data items with One-Time binding. The UI will then reflect the initial value of the data item but will not automatically reflect changes in that underlying data item. "Avalon" also supports One-Way and Two-Way binding. In One-Way binding the target of the binding responds automatically to changes in a source data item. To bind so that changes in your source data item are automatically reflected in your binding target, you must typically add code to support property change notifications. You do this by deriving your source data item class from IPropertyChange and then declaring the PropertyChanged event as a PropertyChangedEventHandler delegate. Declaring the event is how you implement the IPropertyChange interface on your data item. Within the data item you then define your own notification method containing program logic that eventually raises the event by calling back through its event handler. You typically call your notification method within the set method of your data item property when you determine that the data value of the property has changed. The set method of your property is called when the property is assigned a value by outside users of your data item.

In the following code, the data item is declared as a NumberListItem class that derives from IPropertyChange. Though other properties of the data item could be exposed, in this example one property, NLValue, is exposed as sufficient for this class. In compliance with the IPropertyChange interface contract, the class also exposes the public event PropertyChanged. A private NotifyPropertyChanged method is used internally as the method to call for notification. It accepts the name of an exposed property as a string, in this case NLValue. Within the notification method the event condition is raised by calling the event handler through the declared event. Of course, as a precaution against a null reference exception, the callback is only attempted if the event has been assigned a non-null reference to an event handler. That assignment is normally done by the system ahead of time when objects of this data item class are instantiated. The callback invocation of the event handler also accepts the name of the property, but only if that name is enveloped within a PropertyChangedEventArgs object that is created anew for this purpose. To complete the notification support, within the set method of the property a call to the private NotifyPropertyChanged method is done when a change in the value of the property is detected. Both the value assignment and the notification are done only if the new value passed to the set method is different than the current value of the property, _NLValue.

For C#, here is the declaration of the data item class.

```
public class NumberListItem : IPropertyChange
{
private int _NLValue = 0;
static NumberListItem( )
{
}
public int NLValue
{
get
{
return _NLValue;
}
set
{
if (_NLValue != value)
{
_NLValue = value;
NotifyPropertyChanged("NLValue");
}
}
}
// The following variable and method provide the support for
// handling property change notifications.
public event PropertyChangedEventHandler PropertyChanged;
private void NotifyPropertyChanged(String info)
{
if (PropertyChanged != null)
PropertyChanged(this, new PropertyChangedEventArgs(info));
}
}
```

For Microsoft® Visual Basic® .NET, here is the declaration of the data item class.

```
Public Class NumberListItem
Implements IPropertyChange
Private _NLValue As Integer = 0
Shared Sub New( )
End Sub 'New
'The following event and method provide the support for
'handling property change notifications.
Public Event PropertyChanged As PropertyChangedEventHandler
```

-continued

```
Implements IPropertyChange.PropertyChanged
    Private Sub NotifyPropertyChanged(ByVal info As String)
    RaiseEvent      PropertyChanged(Me,       New
PropertyChangedEventArgs(info))
    End Sub 'NotifyPropertyChanged
    Public Property NLValue( ) As Integer
    Get
    Return _NLValue
    End Get
    Set
    If _NLValue <>value Then
    _NLValue = value
    NotifyPropertyChanged("NLValue")
    End If
    End Set
    End Property
    End Class 'NumberListItem
    Create a One-Way Binding to a Dynamically Updated Data Source
```

This example shows how binding to a data object where PropertyChanged is implemented with a one-way binding will refresh the bound properties in a control whenever the data changes.

For most bindings, you want to use either a one-way or two-way binding, so that the destination element reflects data changes in the bound source property. If you want these updates to happen automatically as intended, it is an absolute requirement that the individual data properties each raise the PropertyChanged event upon an internal change in their value, and, therefore, either the overall data class or the individual items in a data collection must typically implement IPropertyChange.

The C# example shown here is the complete code for a data class and includes an internal timer loop that produces real-time changes in the underlying data properties. This scenario is similar to implementing a "stock ticker" in a Web page, where the application is consuming data that could change at any time, but not necessarily writing back to the source.

```
using System;
using System.ComponentModel;
using System.Windows;
using System.Windows.Controls;
using System.ComponentModel;
using System.Windows.Data;
namespace WCPSample {
public class myDataCollection: ArrayListDataCollection
{
public myDataCollection _changeThis;
public myData item1 = new myData("Ichiro Bobblehead",(decimal)24.95);
public myData item2 = new myData("Edgar Toy Duck",(decimal) 16.05);
public myData item3 = new myData("Jeff Cirillo Golden Sombero", (decimal) 0.99);
public myDataCollection( ):base( )
{
Add(item1);
Add(item2);
Add(item3);
CreateTimer( );
}
private void CreateTimer( )
{
System.Timers.Timer Timer1 = new System.Timers.Timer( );
Timer1.Enabled = true;
Timer1.Interval = 10000;
Timer1.Elapsed                              +=                    new
System.Timers.ElapsedEventHandler(Timer1_Elapsed);
}
private      void      Timer1_Elapsed(object             sender,
```

-continued

```
System.Timers.ElapsedEventArgs e)
{
    item1.BidItemPrice += (decimal) 1.10;
    item2.BidItemPrice += (decimal) 0.40;
}
}
public class myData: IPropertyChange
{
    private string _biditemname = "Unset";
    private decimal _biditemprice = (decimal) 0.0;
    public myData(string NewBidItemName, decimal NewBidItemPrice) {
        _biditemname = NewBidItemName;
        _biditemprice = NewBidItemPrice;
    }
    public string BidItemName
    {
        get
        {
            return _biditemname;
        }
        set
        {
            if(_biditemname.Equals(value) == false)
            {
                _biditemname = value;
                //Call Notify PropertyChanged whenever the property is updated
                NotifyPropertyChanged("BidItemName");
            }
        }
    }
    public decimal BidItemPrice
    {
        get
        {
            return _biditemprice;
        }
        set
        {
            if(_biditemprice.Equals(value) == false)
            {
                _biditemprice = value;
                //Call Notify PropertyChanged whenever the property is updated
                NotifyPropertyChanged("BidItemPrice");
            }
        }
    }
    //Declare event
    public event PropertyChangedEventHandler PropertyChanged;
    //NotifyPropertyChanged event handler to update property value in binding
    private void NotifyPropertyChanged(string propName)
    {
        if (PropertyChanged !=null)
        {
            PropertyChanged(this, new PropertyChangedEventArgs(propName));
        }
    }
}
}
abstract interface System.ComponentModel.IPropertyChange
{
}
```

Describes a sort qualifier that is used to sort items in a collection when creating a view. An array of these qualifier descriptions is used to set the Sort property of a collection view.

Method Description

Equals—Indicates whether this instance and a specified object are equal. Inherited from ValueType.

Finalize—Allows an Object to attempt to free resources and perform other cleanup operations before the Object is reclaimed by garbage collection. Inherited from Object.

GetHashCode—Returns the hash code for this instance. Inherited from ValueType.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

SortDescription—Initializes a new instance of a SortDescription structure.

ToString—Returns the fully qualified type name of this instance. Inherited from ValueType.

Property Description

Direction—Gets the sort direction value declared in this sort direction item.

Empty—Represents an empty sort description array. This method is intended to be called statically.

PropertyName—Gets the property name declared by this sort direction item. This property should be exposed as public in the underlying collection.

How Do I Sort Data?

This example describes how to sort data in a data collection view. A data collection is a group of data of type IEnumerable, where members of the collection implement IPropertyChange and the collection itself implements ICollectionChange. A data collection view is one possible view of that collection, where additional conditions such as sorting and filtering can be applied to the collection, but these views leave the underlying collection unchanged.

To sort the data, set the Sort property on any view class derived from CollectionView. This property is set to an array of SortDescription structures. Each structure describes one property of the data that should be the property sorted upon, and the sort direction. Items in the array of these structures are handled sequentially when the sort is performed.

The following C# example sorts the data in ascending order. Each member of the collection is an Order object and is sorted by the sequence of the order property in the data. MyALCollectionView is an ArrayListCollectionView object obtained from the collection, and sdA is the array of sort descriptions.

sdA[0]=new SortDescription("order",ListSortDirection.Ascending);

MyALCollectionView.Sort=sdA;

You also call Refresh on the view to have the sort order take effect.

MyALCollectionView.Refresh( );

Note: Alternatively, if you are using one of the collection types provided by "Avalon", you can use the custom sort methods on its matching collection view. For instance, if your data collection is based on ListCollectionView, you can use ListCollectionView.CustomSort. This approach is not discussed here.

```
struct sealed System.ComponentModel.SortDescription : ValueType
: Object
{
public ListSortDirection get_Direction( )
public static SortDescription[ ] get_Empty( )
public String get_PropertyName( )
}
```

Although embodiments of data association have been described in language specific to structural features and/or methods, it is to be understood that the subject of the appended claims is not necessarily limited to the specific features or methods described. Rather, the specific features and methods are disclosed as exemplary implementations of data association.

The invention claimed is:

1. A computer readable storage medium having a data programming model executable by a processor embodied thereon, the data programming model comprising:
a data item having a plurality of data item properties, each of these data item properties having an associated value;
a user interface element having an element property with a value that is defined by an association to a respective data item property;
a data style definition configured to define a visual representation of the data item on a user interface, wherein the associated values of the data item properties influence the appearance of a plurality of features of the user interface element, wherein the data items are maintained independently from the data style definition, and wherein the data item is represented on a display as a visual subtree of the user interface element and the data item properties are represented as part of the visual subtree;
a binding definition configured to associate the element property of the user interface element with the data item property, wherein the binding definition facilitates one-time binding wherein a user interface property is initialized from a data item property and wherein the user interface property does not update when changes are made to the data item property after the initialization;
a transform definition developed as a logic component of an application program, the transform definition configured to generate a transformed value of the data item property for association with an element property of the user interface element, wherein the transform definition is interjected in a data path between the data item and the user interface, wherein the transform definition changes how the data item value is represented, wherein representation of the data item is dependent upon the transform definition, wherein the transform definition is separate and distinct from the data style definition and is applied to the data item prior to the data style definition, and wherein the transformed value of the data item property being generated from the associated value of the data item property such that the associated value of the data item property is maintained unchanged in a data item database; and
a content presenter configured to apply the data style definition to an instantiation of a display element on the user interface to display one or more of the data items according to the defined visual representation by combining the data from the data items and the information from the data style definition.

2. A data programming model as recited in claim 1, wherein the transform definition is configured to generate a transformed value of the data item property for compatible association with the element property of the user interface element.

3. A data programming model as recited in claim 1, further comprising an update logic component configured to receive a user interface element update that corresponds to a change of the value of the element property of the user interface element, and further configured to update the associated data item property with the value change of the element property of the user interface element.

4. A data programming model as recited in claim 1, further comprising:
a data context property configured to define the data item as the data source of the user interface element; and
an additional binding definition configured to associate an element property of an additional user interface element with an additional data item property of the data item, the additional user interface element having a dependent association to the user interface element, and the additional binding definition further configured to default to the data context property to define the data item as the data source of the additional user interface element.

5. A data programming model as recited in claim 1, further comprising:
a data context property configured to define the data item as the data source of the user interface element;
an additional binding definition configured to associate an element property of an additional user interface element with an additional data item property of the data item, the additional user interface element having a dependent association to the user interface element, and the additional binding definition further configured to default to the data context property to define the data item as the data source of the additional user interface element; and
wherein a change of the value of the element property of the user interface element initiates a change of a value of the element property of the additional user interface element according to the default data context property.

6. A data programming model as recited in claim 1, further comprising:
a collection of data items; and
a representation of the data items each configured for display in a user interface display element that is associated with a referenced data item in the representation of the data items.

7. A data programming model as recited in claim 1, further comprising:
a collection of data items; and
a first representation of the data items in the collection and at least a second different representation of the data items in the collection, the first representation and the second different representation each being configured to reference the data items in the collection.

8. A data programming model as recited in claim 1, wherein the data style definition further comprises an internal representation of the user interface element, wherein the user interface element represents the combination of the value of the data item property and information from the data style definition, the data style definition describing how to display the data item property;
a template, wherein the template is a general form of the visual representation of the data item, wherein the template requires that part of the visual representation be obtained as a data item property value; and
a tree assembler module comprising a style lookup module and a data bind module, wherein the data bind module locates any style elements of the data item and binds a property of a user interface element to a data item property.

9. A data programming model as recited in claim 1, further comprising a data style definition configured to define a visual representation of data items as a data tree.

10. A computing system, comprising:
one or more processing units;
a system memory coupled to the processing unit, storing at least one of a plurality of programs, the programs comprising:

an application program configured to generate a user interface having a display element to display a representation of a data item;

a data programming model configured to implement a binding definition to associate a display element property of the display element with a data item property of the data item such that a value of the data item property is displayed as the representation of the data item, wherein the binding definition facilitates one-time binding wherein a user interface property is initialized from a data item property and wherein the user interface property does not update when changes are made to the data item property after the initialization, wherein the data programming model comprises:

a transform definition developed as a logic component of the application program, the transform definition configured to generate a transformed value of the data item property for association with an element property of the user interface element by a binding definition, wherein the transform definition is interjected in a data path between the data item and the user interface, wherein the transform definition changes how the data item value is represented, and wherein representation of the data item is dependent upon the transform definition; and a data style definition configured to define the representation of the data item on the user interface, wherein the associated value of the data item property influences the appearance of a feature of the user interface element, wherein data items are maintained independently from the data style definition, and wherein the data item is represented on a display as a visual subtree of the user interface element and the data item properties are represented as part of the visual subtree, and wherein the data style definition is separate and distinct from the transform definition and is applied to the data item after the transform definition, wherein the data style definition further includes an internal representation of the user interface element, wherein the user interface element represents the combination of the value of the data item property and information from the data style definition, the data style definition describing how to display the data item property;

a template, wherein the template is a general form of the visual representation of the data item, wherein the template requires that part of the visual representation be obtained as a data item property value; and a tree assembler module comprising a style lookup module and a data bind module, wherein the data bind module locates any style elements of the data item and binds a property of a user interface element to a data item property.

11. A computing system as recited in claim 10, wherein the data programming model comprises a transform definition to generate a transformed value of the data item property for association with the display element property.

12. A computing system as recited in claim 10, wherein the data programming model comprises a transform definition to generate a transformed value of the data item property for association with the display element property, the transformed value of the data item property being generated from the value of the data item property such that the value of the data item property is maintained unchanged in a data item database.

13. A computing system as recited in claim 10, wherein the data programming model comprises a transform definition developed as a logic component of the application program, the transform definition configured to generate a transformed value of the data item property for association with the display element property.

14. A computing system as recited in claim 10, wherein the data programming model comprises a transform definition configured to generate a transformed value of the data item property for compatible association with the display element property.

15. A computing system as recited in claim 10, wherein the data programming model comprises an update logic component configured to receive a display element update that corresponds to a change of the value of the display element property, and is further configured to update the associated data item property with the value change of the display element property.

16. A computing system as recited in claim 10, wherein the data programming model comprises:

a data context property configured to define the data item as the data source of the display element; and an additional binding definition configured to associate a display element property of an additional display element with an additional data item property of the data item, the additional display element having a dependent association to the display element, and the additional binding definition further configured to default to the data context property to define the data item as the data source of the additional display element.

17. A computing system as recited in claim 10, further comprising a collection of data items, and wherein the data programming model includes a representation of the data items each configured for display in a user interface display element that is associated with a referenced data item in the representation of the data items.

18. A computing system as recited in claim 10, further comprising a collection of data items, and wherein the data programming model comprises a first representation of the data items in the collection and at least a second different representation of the data items in the collection, the first representation and the second different representation each being configured to reference the data items in the collection.

19. A computing system as recited in claim 10, wherein the data style definition is configured to define a template for the display element to display the value of the data item property.

20. A method, comprising:

developing a data item having a data item property with an associated value for display on a user interface generated by an application program, the data item being developed independently of display-related information corresponding to the user interface;

developing the application program independently of the data item;

defining a binding association between an element property of a user interface element and the data item property such that a value of the element property is defined by the association to the data item property, wherein the binding association facilitates one-time binding wherein a user interface property is initialized from a data item property and wherein the user interface property does not update when changes are made to the data item property after the initialization;

developing a transform definition as a logic component of the application program, the transform definition configured to generate a transformed value of the data item property for association with an element property of the user interface element by a binding definition, wherein the transform definition is interjected in a data path between the data item and the user interface, wherein the transform definition changes how the data item value is represented, and wherein representation of the data item is dependent upon the transform definition;

developing a data style definition configured to define the presentation of the data item on the user interface, wherein the associated value of the data item property influences the appearance of a feature of the user interface element, wherein the data item is maintained independently from the data style definition, and wherein the data item is represented on a display as a visual subtree of the user interface element and the data item properties are represented as part of the visual subtree, and wherein the data style definition is separate and distinct from the transform definition and is applied to the data item after the transform definition;

developing a template, wherein the template is a general form of the visual representation of the data item, wherein the template requires that part of the visual representation be obtained as a data item property value; and using a tree assembler module comprising a style lookup module and a data bind module, wherein the data bind module locates any style elements of the data item and binds a property of a user interface element to a data item property.

21. A method as recited in claim 20, further comprising generating a transformed value of the data item property for association with the element property of the user interface element.

22. A method as recited in claim 20, further comprising generating a transformed value of the data item property for association with the element property of the user interface element, the transformed value of the data item property being generated from the associated value of the data item property such that the associated value of the data item property is maintained unchanged in a data item database.

23. A method as recited in claim 20, further comprising developing a transform definition as a logic component of the application program, the transform definition being configured to generate a transformed value of the data item property for association with the element property of the user interface element.

24. A method as recited in claim 20, further comprising generating a transformed value of the data item property for compatible association with the element property of the user interface element.

25. A method as recited in claim 20, further comprising receiving a user interface element update that corresponds to a change of the value of the element property of the user interface element, and updating the associated data item property with the value change of the element property of the user interface element.

26. A method as recited in claim 20, further comprising:
defining a data context property to identify the data item as the data source of the user interface element; and
defining an additional binding association between an element property of an additional user interface element and an additional data item property of the data item, the additional user interface element having a dependent association to the user interface element, and the additional binding association defaulting to the data context property to identify the data item as the data source of the additional user interface element.

27. A method as recited in claim 20, further comprising:
defining a collection of data items; and
developing a representation of the data items for display in user interface display elements that are each associated with a referenced data item in the representation of the data items.

28. A method as recited in claim 20, further comprising:
defining a collection of data items; and
developing a first representation of the data items in the collection and at least a second different representation of the data items in the collection, the first representation and the second different representation each referencing the data items in the collection.

29. A method as recited in claim 20, wherein the data style definition further comprises an internal representation of the user interface element, wherein the user interface element represents the combination of the value of the data item property and information from the data style definition, the data style definition describing how to display the data item property.

30. A method as recited in claim 20, wherein the data style definition comprises a data tree.

31. A method as recited in claim 30, wherein the data items are maintained independently from the data style definition.

32. A method as recited in claim 20, further comprising:
applying the data style definition to an instantiation of a display element on the user interface to display one or more of the data items according to the defined visual representation.

33. A method as recited in claim 20, further comprising declaring an instance of a data class which corresponds to a type of data as a resource, and wherein defining the binding association comprises referring to the data class in a declaration of the binding association.

* * * * *